Dec. 11, 1951 L. G. MILLER 2,577,907
UPPER SHAPING MACHINE
Filed Nov. 10, 1949 14 Sheets-Sheet 1

Inventor
Lloyd G. Miller
By his Attorney

Dec. 11, 1951     L. G. MILLER     2,577,907
UPPER SHAPING MACHINE
Filed Nov. 10, 1949     14 Sheets-Sheet 2

Inventor
Lloyd G. Miller
By his Attorney

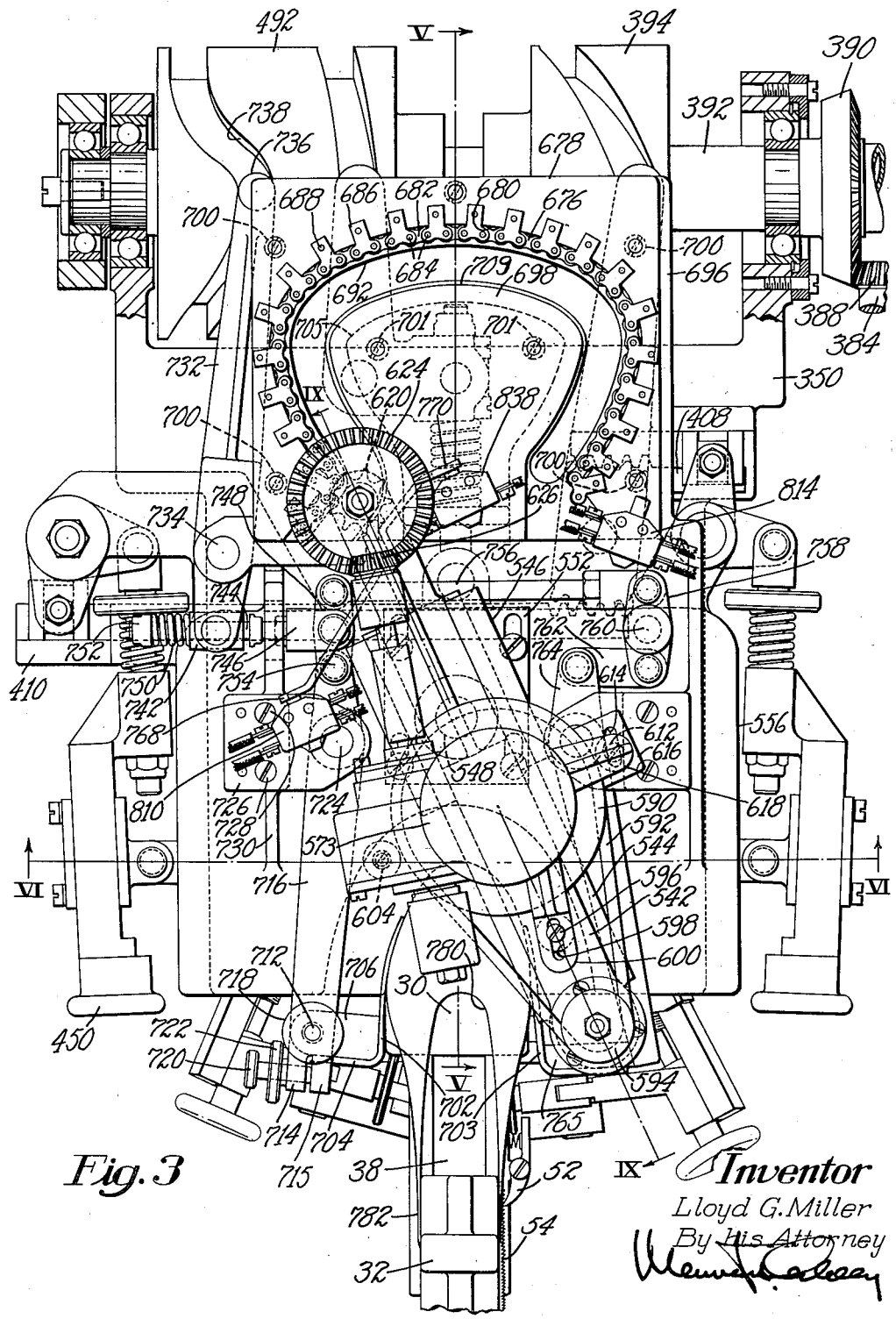

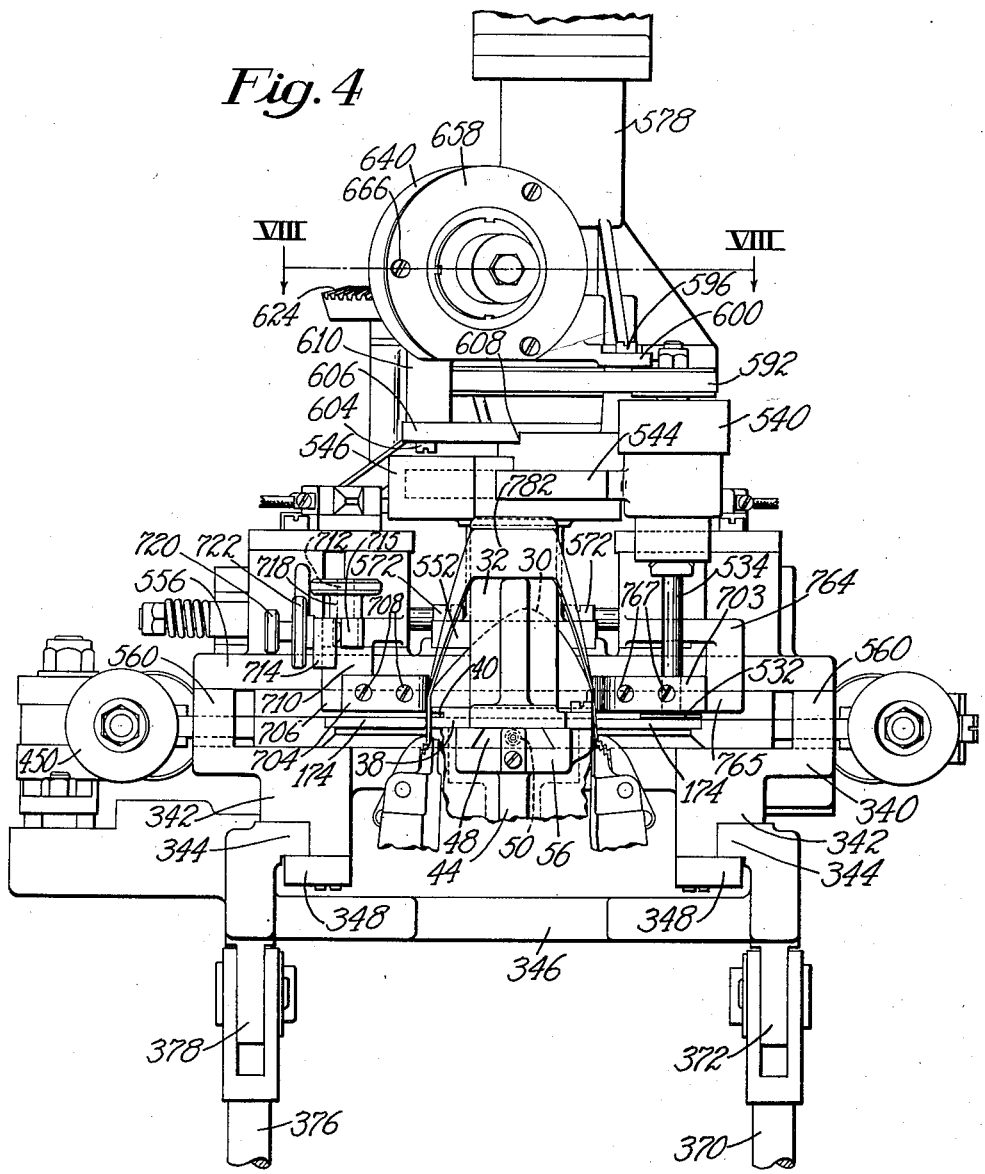

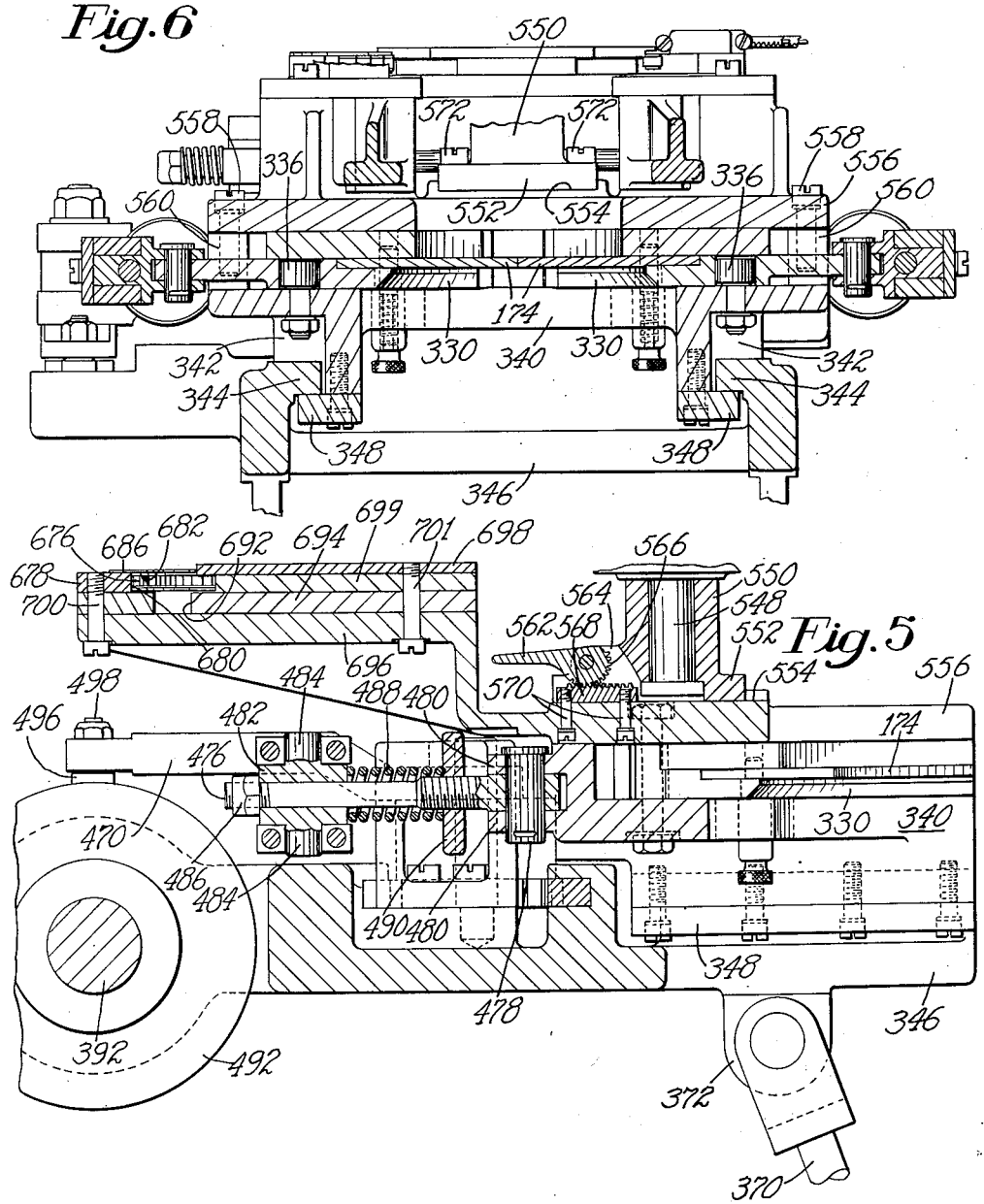

Dec. 11, 1951 L. G. MILLER 2,577,907
UPPER SHAPING MACHINE
Filed Nov. 10, 1949 14 Sheets-Sheet 7
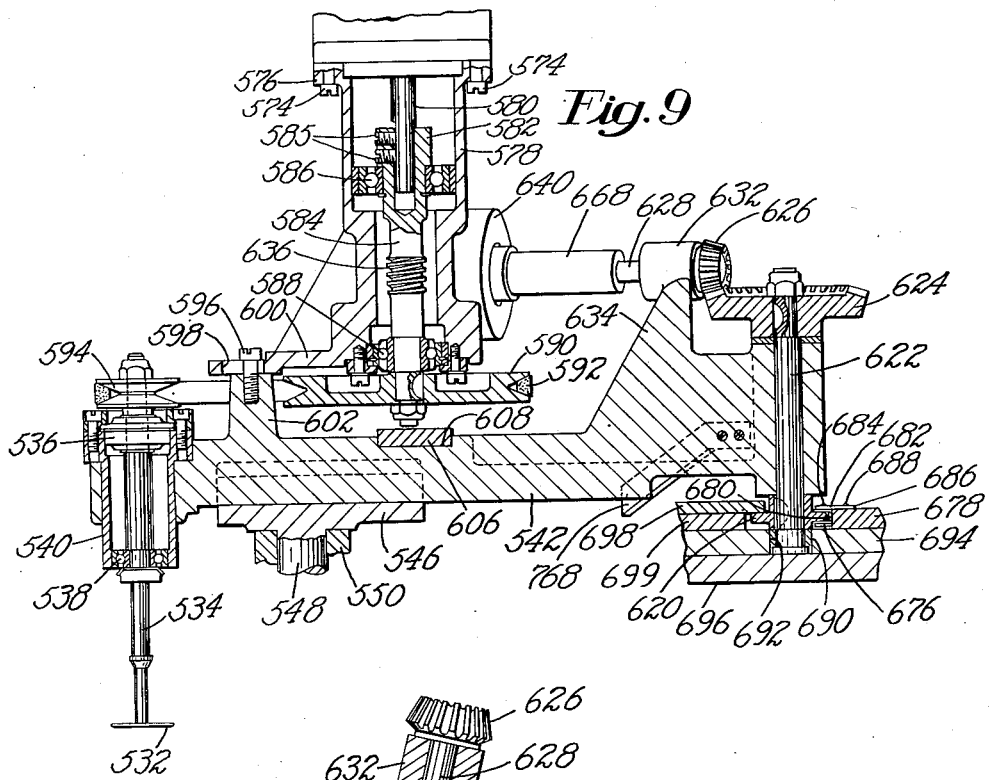
Inventor
Lloyd G. Miller
By his Attorney Dec. 11, 1951 L. G. MILLER 2,577,907
UPPER SHAPING MACHINE
Filed Nov. 10, 1949 14 Sheets-Sheet 8

Inventor
Lloyd G. Miller
By his Attorney

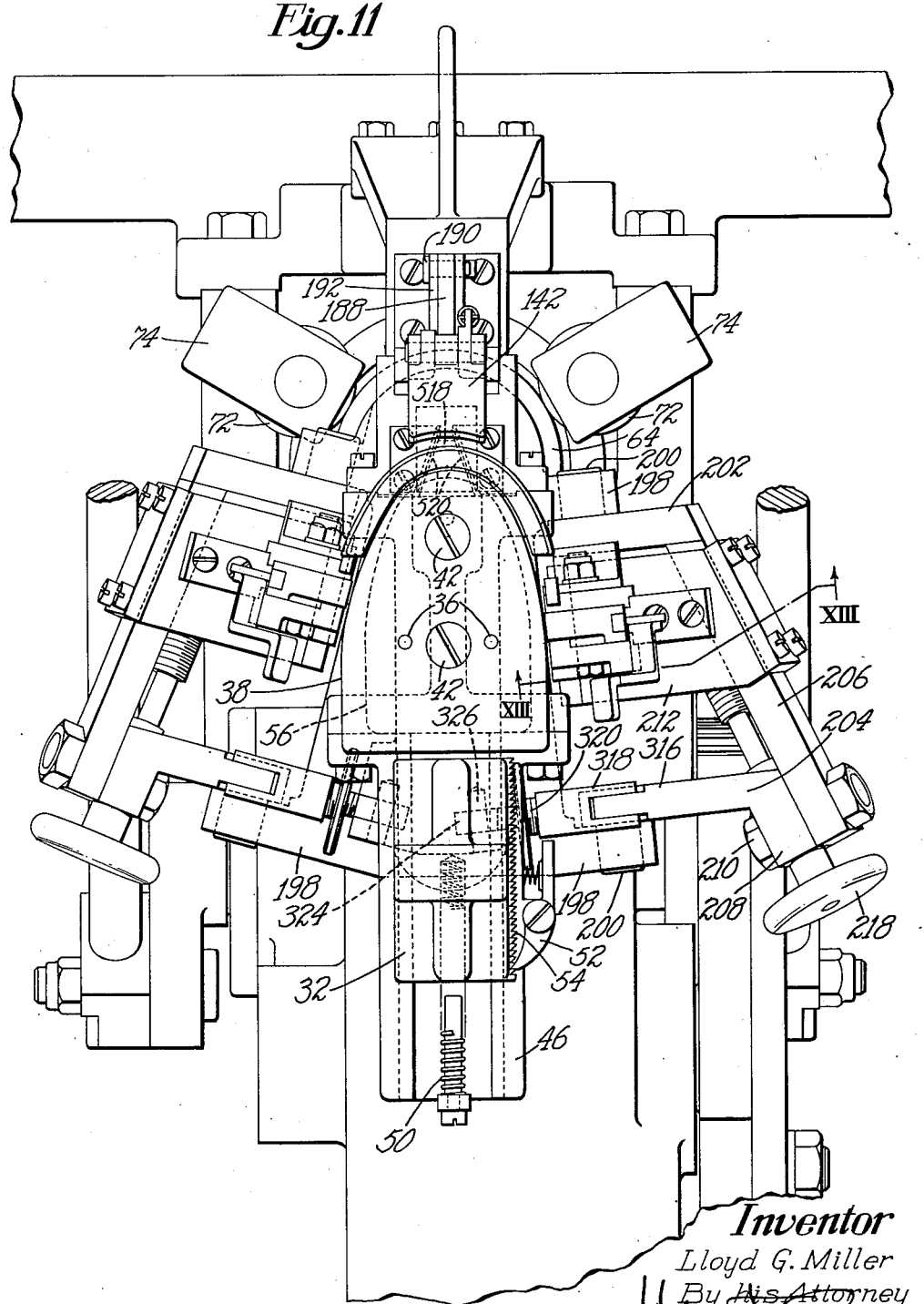

Dec. 11, 1951 L. G. MILLER 2,577,907
UPPER SHAPING MACHINE
Filed Nov. 10, 1949 14 Sheets-Sheet 10
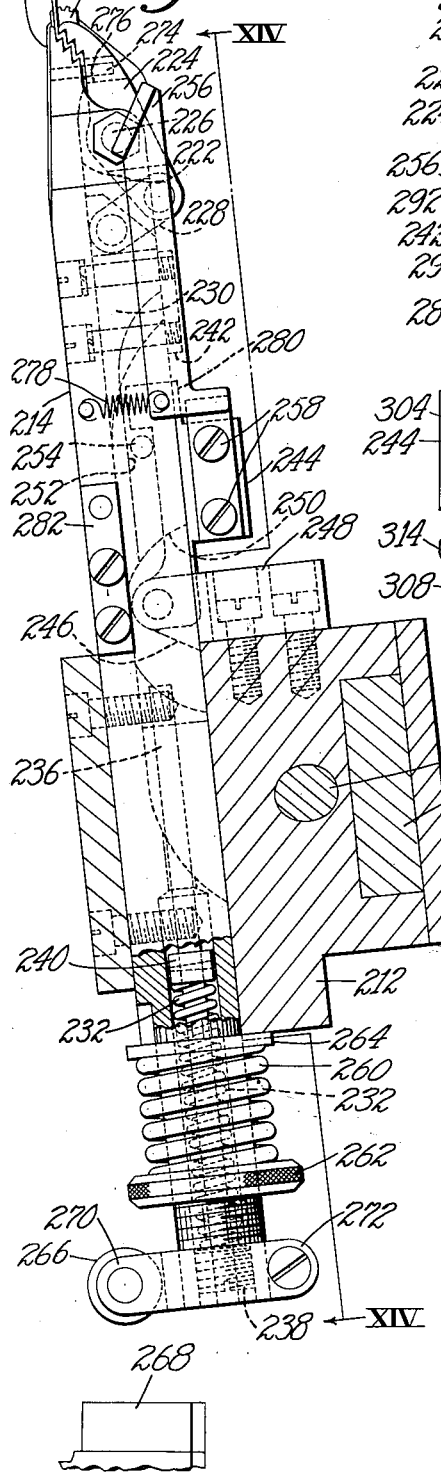
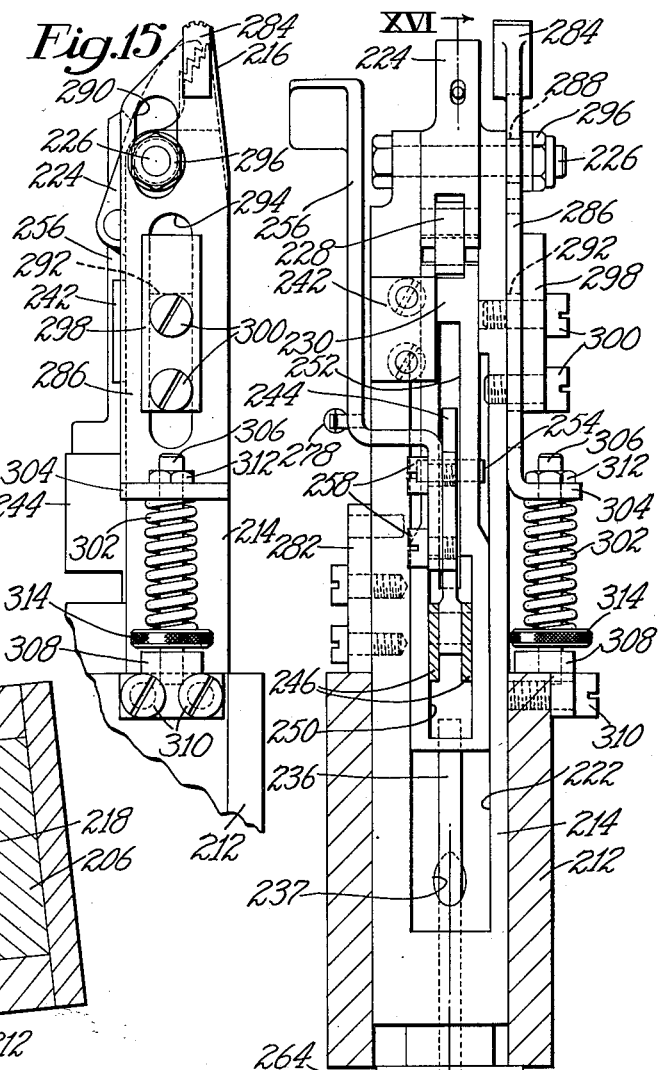
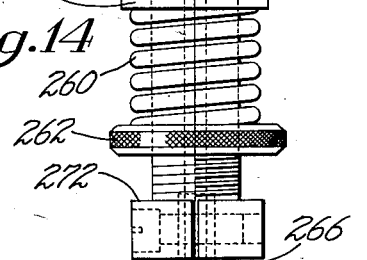
Inventor
Lloyd G. Miller
By his Attorney

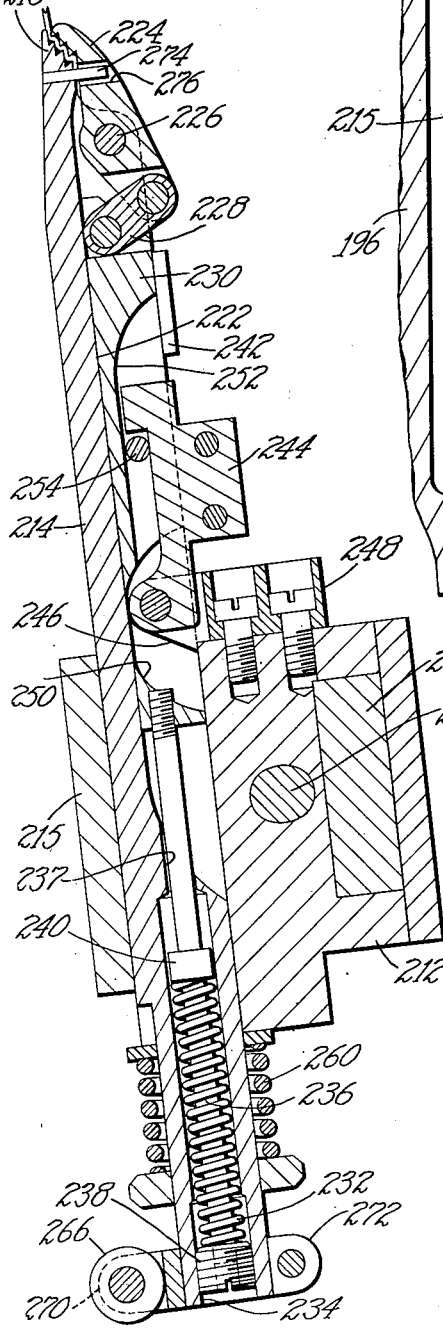
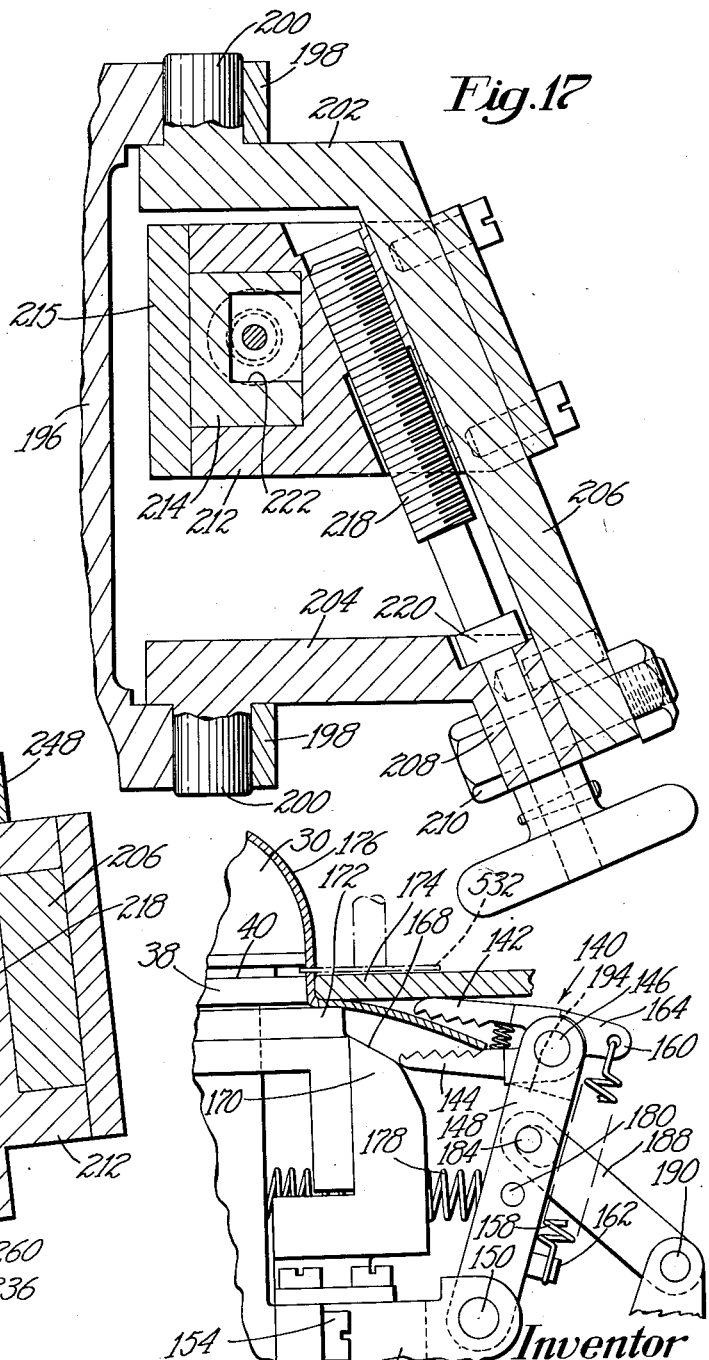

Dec. 11, 1951 L. G. MILLER 2,577,907
UPPER SHAPING MACHINE
Filed Nov. 10, 1949 14 Sheets-Sheet 12

Inventor
Lloyd G. Miller
By his Attorney

Dec. 11, 1951     L. G. MILLER     2,577,907

UPPER SHAPING MACHINE

Filed Nov. 10, 1949     14 Sheets—Sheet 14

Inventor
Lloyd G. Miller
By his Attorney

Patented Dec. 11, 1951

2,577,907

UNITED STATES PATENT OFFICE 2,577,907

UPPER SHAPING MACHINE

Lloyd G. Miller, Beverly, Mass., assignor to United Shoe Machinery Corporation, Flemington, N. J., a corporation of New Jersey Application November 10, 1949, Serial No. 126,586

52 Claims. (Cl. 12—97)

This invention relates to machines for shaping uppers over forms and is herein illustrated in its application to machines for shaping the toe portions of shoe uppers preparatory to their attachment to an insole or sock lining off the last.

The manufacture of slip lasted shoes having closed toes requires a preliminary shaping of the toe portion to provide an upper with a bottom edge the linear measure of which corresponds substantially to the length of the corresponding portion of the edge of the insole or sock lining. In order for the edge of the upper to retain the linear measure imparted thereto in the preliminary shaping operation it has been found desirable to provide the upper with means which will stiffen and retain the preliminary shape imparted to the upper. It will be understood that that portion of the upper in which the stiffener is mounted must receive substantially its final contour in the preliminary shaping operation.

It is an object of the present invention to provide an upper shaping machine adapted to shape an upper over a shoe form and to hold it so shaped on the form while a toe stiffening means incorporated in the upper sets to retain the shape imparted to the upper. It is a further object of the invention to provide in a machine of the type above described means for trimming the upper along a line defining the registration of the edge of the insole or sock lining with the bottom margin of the upper.

With the above objects in view the present invention comprises novel combinations of upper shaping and trimming devices constructed and arranged to shape the toe portion of an upper over work supporting members and to hold it so shaped during the trimming operation. A feature of the invention comprises a combination consisting of a shoe form herein illustrated as a member having substantially the shape of the toe portion of a last, a support on which the shoe form is mounted, means for mounting said support for angular movement on an axis extending heightwise of a shoe upper supported on the form, said axis coinciding with the extremity of the toe portion of the upper, wiping means herein illustrated as a pair of toe wipers, a presser member or retarder constructed and arranged to cooperate with said wiping means, and means mounting said retarder for angular movement on an axis common to the axis of the support. It will be understood that the provision of a work supporting means mounted for swiveling movement on an axis extending heightwise of a supported upper permits the work support to move in response to the pressure of the wipers so that the pressure is equalized on opposite sides of the upper. In order to tension the upper heightwise over the form there is provided in combination with the work supporting, wiping and retarding means above described, a pair of side grippers and a toe gripper and means for mounting said grippers on the support which mounts the shoe form. In order to cause the retarder to press the outturned margin of the upper against the wipers and to maintain such pressure during the wiping operation there is incorporated with the retarder a novel friction means and means for effecting relative movement of the retarder and the friction means into mutual engagement thereby to resist relative movement of the retarder and the upper supporting form heightwise of the supported upper. In the illustrated organization power operated means moves the retarder heightwise of the upper into proximity to the wipers and the friction means resists movement of the retarder in the opposite direction thus causing the outturned margin of the upper to be pressed between the wipers and the retarder during the wiping operation.

In addition to its function of pressing the outwardly flanged margin of the upper against the wiper the illustrated retarder has incorporated therein means for closing a pair of gripper jaws on the upper and then moving the jaws bodily to apply tension to the upper. To this end there is mounted on the retarder a cam member which operates during the advancement of the retarder by power first to close the gripper jaws on the upper and then to impart a movement of translation to said jaws. In order to cause the gripper jaws to open and move away from the upper when the upper tensioning operation has been completed the illustrated machine is provided with means operated by movement of the retarder heightwise of the upper to move the gripper jaws away from the upper.

It is to be understood that in its application to upper tensioning means, as above set forth, the invention is not limited to an organization in which the gripper jaws receive their movements from means actuated by or incorporated in a retarder, since this feature of the invention in its broadest aspect is applicable to an organization in which the movements of the gripper jaws are effected by any suitable means. In fact the illustrated upper tensioning means is applicable to an upper shaping machine which is not provided with upper wiping and retarding means.

Another feature of the invention consists in the provision in a machine for shaping uppers over forms, of upper tensioning means comprising a pair of gripper jaws one of which is spring biased to a predetermined position in order to hold the jaws normally open while the other jaw is freely mounted for opening and closing movements, said jaws being pivotally mounted on an arm which is normally urged in a direction to hold the freely mounted jaw against a cam member which is operated to close the jaws on the work.

The invention provides another novel gripper construction comprising a bar slidably mounted in a carrier and having a gripper jaw formed at one end thereof in cooperating relation to a gripper jaw pivotally mounted on said bar. For closing the jaws on the work a slide carried by said bar and connected to the pivotally mounted gripper jaw is actuated by a spring upon release of a latch which controls the closing of the jaws. The grippers are actuated to tension the work by means carried by said bar and constructed and arranged to impart a movement of translation thereto. In order to provide for adjustment of the gripper jaws lengthwise of the upper the carrier is mounted on a bracket for rectilinear adjustive movement and a hand screw is provided for effecting such movement of the carrier. The gripper jaws are normally held closed by the action of a slide mounted in the bar and a suitable latch is provided for holding the gripper open when the machine is at rest to permit the insertion of the bottom margin of the upper between the jaws. The latch is manually released to permit the gripper to close on the work. During the latter part of the upper shaping cycle of the machine the jaws are opened by power and the latch member comes into position to hold them against closing movement. For imparting upper tensioning movement to the gripper, means illustrated as a spring is mounted on the bar and arranged to act against the carrier to impart translatory movement to the bar.

The illustrated upper shaping wipers are mounted in a head which swings to carry the wipers from a remote rest position into a predetermined wiping position. The wiper actuating mechanism includes a cam mounted to rotate on an axis coincidental with the axis of swinging movement of the head. The wiper actuating mechanism includes also suitable rack and gear mechanism actuated by the cam above referred to. The wipers are individually adjustable in their respective paths of operating movement by hand screws incorporated in the wiper actuating mechanism.

The upper trimming operation is performed by a cutter which is mounted for rotary and translatory movement, a single actuator being provided for rotating the cutter and imparting a predetermined movement of translation thereto and a roll being provided for causing the cutter to travel in a predetermined path about the supported upper, the roll being mounted on the cutter carrier and arranged to travel in a track. For imparting translatory movement to the cutter a driven sprocket is mounted on the carrier and arranged to mesh with a fixed chain mounted in predetermined space relation to said track. In order to provide for return movement of the cutter to its starting position after performing the cutting operation, suitable means is provided for reversing the direction of rotation of the cutter operating motor as the cutter comes to the end of its cutting movement. As the cutter comes to the limit of its return movement the motor is automatically stopped and the cutter comes to rest. In order to provide for adjustment of the path of movement of the cutter in accordance with the width of the upper to be operated upon the head which mounts the cutter carrier is mounted for adjustive movement toward and from an upper in the machine, thereby changing the location of the axis on which the carrier swings and proportionally altering the magnitude of the path of movement of the cutter.

For cooperating with the retarding means hereinbefore referred to, the invention provides additional retarding means mounted on the bars which carry the side gripper jaws. Said retarding means is mounted on the bar for movement toward and from the upper by a spring mounted on the member in which the bar is carried.

The illustrated work supporting means comprises a toe form and a plate mounting said toe form and having a groove extending inwardly from its edge face, said groove, in the illustrated machine, providing clearance for the operation of the trimming cutter. Associated with the toe form is a heel form mounted for movement toward and from the toe form. The illustrated heel form is provided with a recess for receiving the strap at the heel end of a slingback upper. The plate is removably secured to a work support in which the heel form is slidably mounted and normally held at the limit of its movement toward the toe form. A suitable latch is provided in the work support for holding the heel form in a position determined by the length of the upper to be operated upon. At the upper end of the illustrated work support there is a head on which the plate is mounted and means is provided for securing to said head, in predetermined relation thereto, any one of a plurality of such plates.

These and other features of the invention will now be described with reference to the accompanying drawings and pointed out in the appended claims.

In the drawings,

Fig. 3 is a view looking downwardly and rearwardly at the upper portion of the machine in the direction of the height of a shoe in the machine, the machine being in that stage of its cycle shown on Fig. 1;

Fig. 4 is a front elevation of the head of the machine taken at that stage in the machine cycle shown in Figs. 1 and 3;

Fig. 5 is a section taken substantially on the line V—V of Fig. 3;

Fig. 6 is a section taken substantially on the line VI—VI of Fig. 3;

Fig. 8 is a section taken on the line VIII—VIII of Fig. 4;

Fig. 9 is a sectional elevation taken on the line IX—IX of Fig. 3;

Fig. 11 is a view looking downwardly and rearwardly as in Fig. 3, illustrating mainly the work supporting mechanism and upper gripping mechanisms;

Fig. 12 is a section taken substantially on the line XII—XII of Fig. 1;

Fig. 13 is a section taken substantially on the line XIII—XIII of Fig. 11;

Fig. 14 is a section taken substantially on the line XIV—XIV of Fig. 13;

Fig. 15 is a side elevation of the upper portion of the gripper unit shown in Fig. 14 looking at the right side of the unit as it appears in Fig. 14;

Fig. 16 is a section taken on the line XVI—XVI of Fig. 14;

Fig. 17 is a section taken substantially on the line XVII—XVII of Fig. 10;

Fig. 20 is a side elevation similar to Figs. 18 and 19 showing the parts as they appear during the operation of the upper trimming cutter;

Figure 1:
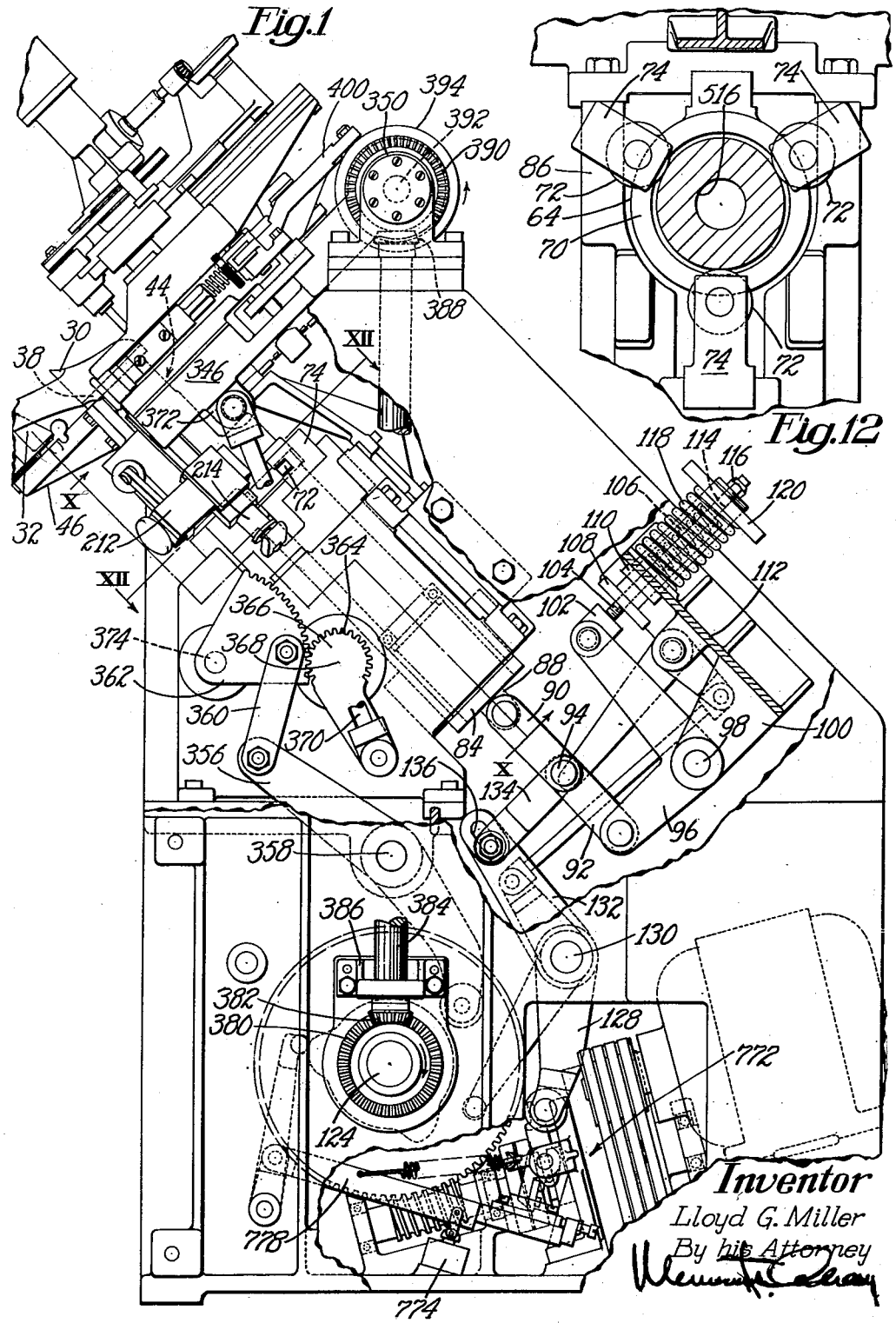
Fig. 1 is a right side elevation of a machine embodying the features of the present invention, portions of the frame being broken away to disclose certain operating mechanisms.

In Fig. 1 there is illustrated one station of a two station machine which is so organized that while an upper is being molded in one station an upper previously molded is being trimmed in the other station.

It will be understood that the following description of the construction and operation of the mechanism in that station of the machine illustrated in Fig. 1 applies equally well to the other station of the machine.

Figure 2:
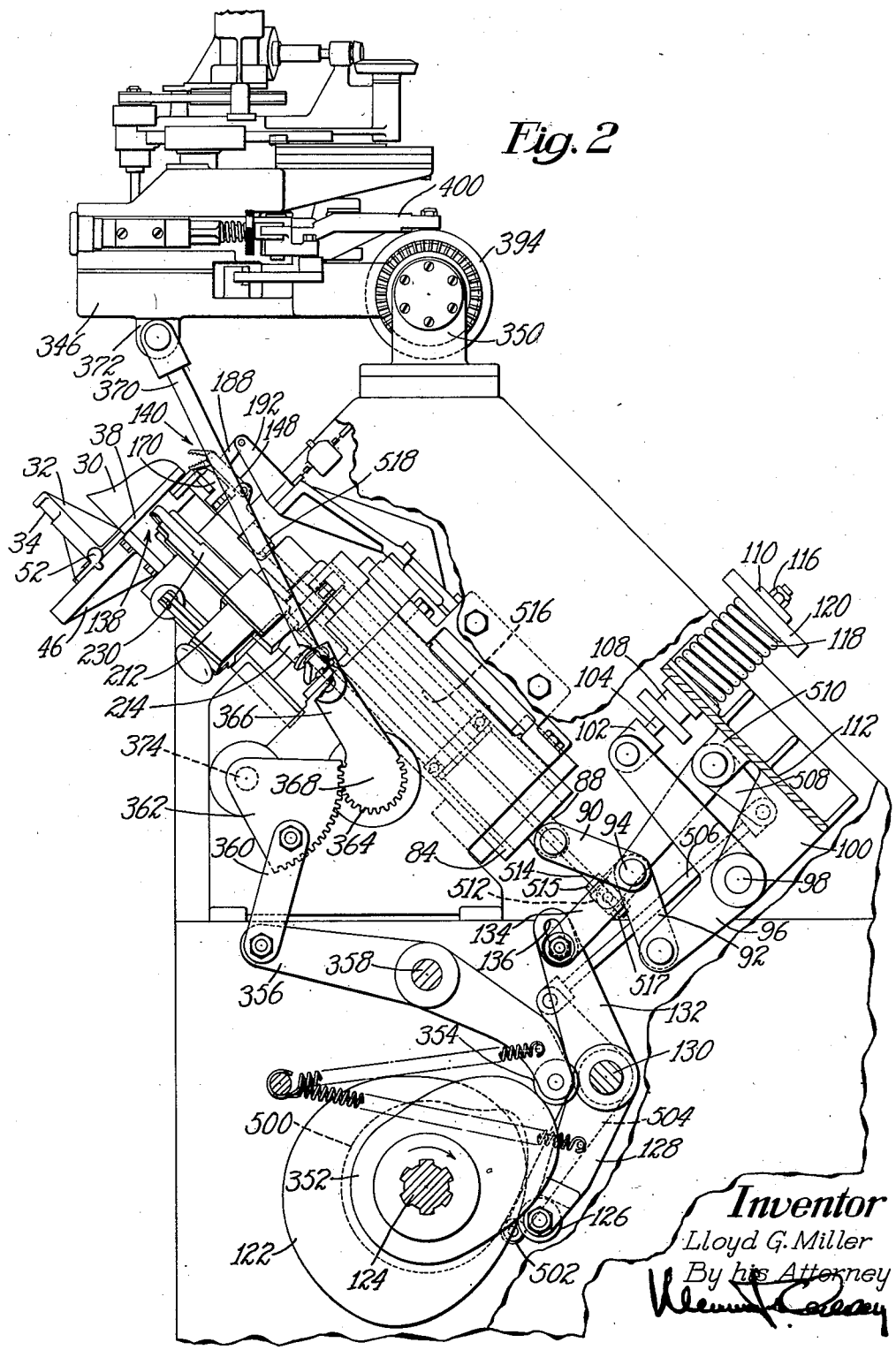
Fig. 2 is a right side elevation similar to Fig. 1 illustrating the machine at a stage in its cycle different from that shown in Fig. 1.

The illustrated machine is provided with work supporting mechanism constructed and arranged to mount a shoe upper having a closed toe and having an open heel characterized by a strap extending around the heel as generally indicated in Fig. 3. The work supporting members comprise a toe form 30 which, as illustrated in the drawings, is designed to shape a left foot upper and a member 32 which, as shown in Fig. 2, is provided with a groove 34 constructed and arranged to receive the strap at the heel end of the upper. The toe form 30 has a flat bottom surface in which there are formed two sockets, said sockets being arranged to receive two pins 36 (Fig. 10) projecting upwardly from a flat plate 38.

Figure 10:
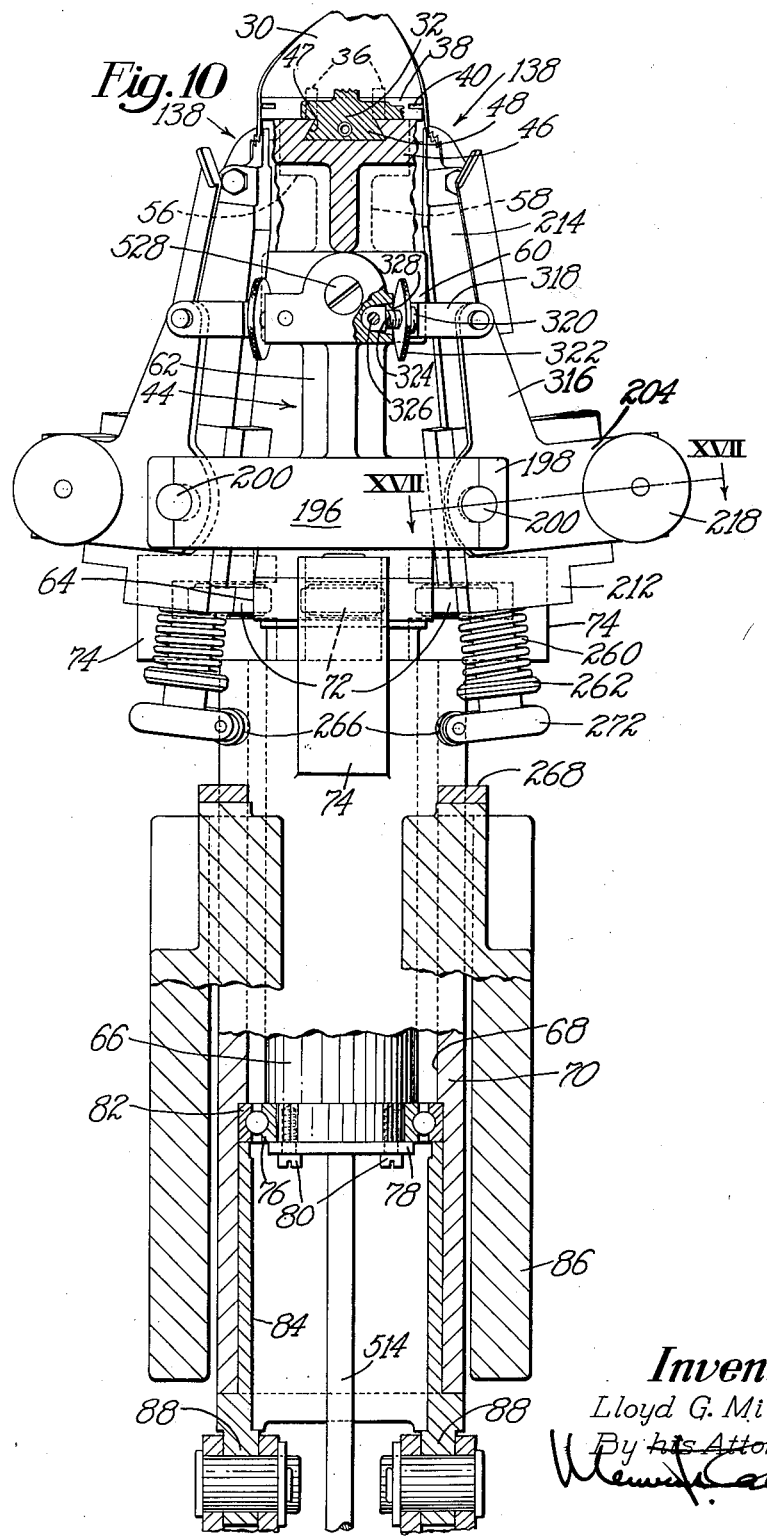
Fig. 10 is a section taken substantially on the line X—X of Fig. 1.

In the operation of the machine the upper is shaped over the toe form 30 and the plate 38 by a pair of toe wipers hereinafter described which apply wiping pressure to the upper while the work supporting members move heightwise of the upper to cause the upper to be wiped against the toe form 30 and against the edge face of the plate 38. The heightwise movement of the work supporting members comes to rest with the wipers in their position shown in Fig. 20 in which position the wipers register with the lower portion of the edge face of the plate 38. It will be understood that the toe form 30 and the plate 38 could be made in one piece if desired but the manufacture of the work supporting members in two sections effects an economy in manufacture inasmuch as the plates 38 do not have to be changed as often as the form 30 and consequently a relatively small number of such plates suffices for a given machine. As shown in Fig. 11, the illustrated plate 38 is patterned to the contour of the forepart of an insole, terminating in the general vicinity of the ball portion of an upper mounted thereon. As shown in Fig. 10, the plate 38 is provided with a groove 40 extending inwardly from its edge face and adapted to provide clearance for the operation of a trimming cutter. The plate 38 is secured by two headed screws 42 (Fig. 11) to the top of a work support or post 44. As shown in Fig. 1, the post 44 has a bracket 46 secured to its upper end portion. The flat top surface of said bracket is arranged flush with the top of the post and provides means for mounting the member 32. The bracket has formed in its upper surface a dove tail groove 47 (Fig. 10) extending lengthwise of an upper in the machine. As shown in Fig. 10, there is slidably mounted in said groove a tongue 48 in the base of the member 32, thus providing for adjustment of said member relatively to the toe form. A spring 50 (Fig. 11) urges the member 32 toward the toe form 30 and a pawl 52 pivotally mounted on an extension of the bracket 46 engages ratchet teeth 54 formed in the member 32 to hold said member against movement toward the toe form after an upper has been mounted on the toe form and the heel member, as shown in Fig. 3. Referring to Fig. 10, the post 44 is characterized by a head 56 which mounts the plate 38 and a structure 58 extending from said head downwardly to a crosshead 60. Extending downwardly from the crosshead 60 is a structure 62 which terminates in a cylindrical head 64 which forms the upper section of a cylindrical base portion 66. To provide for swiveling movement of the work support on an axis coincidental with the point of intersection of the periphery of the toe form 30 and its longitudinal median line, said axis extending heightwise of an upper in the machine, the cylindrical head 64 of the work supporting member is supported against horizontal movement by three rollers 72 (Fig. 12) each of which is mounted in a bracket 74 fast on the machine frame. As shown in Fig. 1, each bracket 74 is provided with a recess in which the roller 72 is pivotally mounted and held against endwise movement. At its lower end the cylindrical base portion 66 of the work supporting member has its diameter reduced to provide a shoulder against which there is secured the inner race 76 of a ball bearing assembly, said race being clamped against said shoulder by a plate 78 secured by screws 80 to the bottom of the base 66. The outer race 82 of the ball bearing assembly is supported on the upper edge face of a sleeve 84 slidably mounted in a counterbored section in the lower portion of a fixed cylinder 70. Projecting downwardly from the sleeve 84 at opposite sides thereof are parallel lugs 88 on which are pivotally mounted the bifurcated upper end portions of two parallel links 90 (Fig. 1) which form the upper portion of a toggle assembly. Cooperating with the links 90 is a link 92 which is pivotally mounted at its upper end on a pin 94 connecting the lower end portions of the links 90, and at its lower end is pivotally mounted at the end of one arm of a bell crank lever 96 pivotally mounted at 98 between arms 100 extending inwardly from the machine frame. Pivotally mounted at the end of the other arm of the bell crank lever is a head 102 which carries a threaded stem 104 extending freely through an opening in the frame. Surrounding the stem 104 is a spring 106 one end of which bears against the end face of a cylindrical member 108 threaded onto the stem and the other end of which is seated at the base of a counterbore in a cylindrical member 110 slidably mounted in an opening in a panel 112 which forms a portion of the frame. The stem 104 extends freely through an opening 114 in the outer portion of the member 110. The free end of the stem carries a nut 116 which bears against the end face of the cylindrical member 110 and is adjustable to vary the pressure of the spring 106 when the machine is at rest. Surrounding the cylindrical member 110 is a spring 118 one end of which bears against the panel 112 and the other end of which bears against a disk 120 threaded onto the outer end portion of the cylindrical member 110 and adjustable thereon to determine the compression of the spring 118 when the machine is at rest. Thus it will be seen that movement of the bell crank lever 96 in a counterclockwise direction in response to the straightening action of the toggle links is resisted by the spring 118, and movement of the bell crank lever in a clockwise direction is resisted by the spring 106. For straightening the toggle links to impart upward movement to the work supporting assembly a cam 122 (Fig. 2) mounted on a cam shaft 124 is constructed and arranged to engage a roll 126 pivotally mounted at the free end of an arm 128 freely mounted on a shaft 130. Mounted for angular movement with the arm 128 is an arm 132 which is connected by a link 134 to the pin 94 connecting the toggle links. The extent of angular movement of the toggle links by the action of the cam 122 may be varied by adjusting the pivotal connection of the link 134 to the arm 132 within the range of a slot 136 in the free end portion of said arm.

Figures 18, 19:
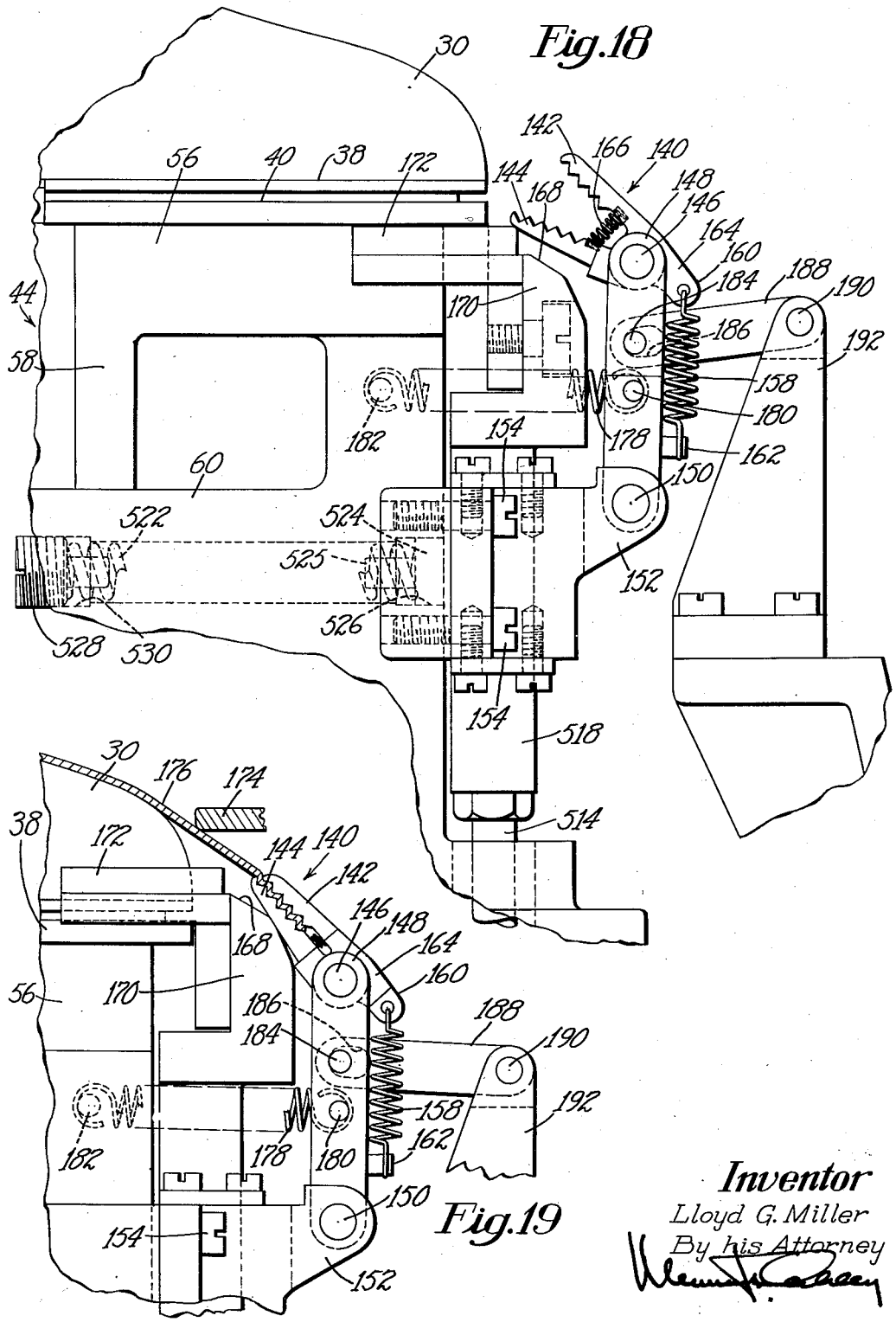
Fig. 18 is a side elevation illustrating the toe gripper assembly together with a portion of the work supporting mechanism.
Fig. 19 is a side elevation similar to Fig. 18 taken at a later stage in the machine cycle.

Before initiating the power cycle of the machine two grippers 138 located at opposite sides of the tip line portion of an upper in the machine are manually closed on the bottom margin of the upper. During the first stage of the upward movement of the work support the grippers 138 tension the upper widthwise over the toe form 30. After an initial widthwise tensioning of the upper a toe gripper 140 closes automatically on the toe end portion of the bottom margin of the upper and operates to apply tension to the upper longitudinally thereof. Referring to Fig. 18, the toe gripper comprises an upper jaw 142 and a lower jaw 144 mounted for opening and closing movements on a pin 146 carried at the upper end of an arm 148 which is mounted for swinging movement on a pin 150 in a bracket 152 secured by screws 154 to the crosshead 60 of the work support. When the machine is at rest the upper jaw 142 of the toe gripper is held in its position illustrated in Fig. 18 by a spring 158 the upper end of which engages a tail portion 160 of the jaw 142 and the lower end of which engages a pin 162 in the arm 148. The angular position of the gripper jaw 142 as shon in Fig. 18 is determined by the engagement of a boss 164 projecting laterally from the jaw 142 with the edge face of the arm 148. The gripper jaws are normally held open as shown in Fig. 18 by a spring 166 positioned between the jaws. The degree of opening movement of the jaws is determined by the engagement of the lower jaw 144 with an upper pressing member or retarder 172 mounted on a head 170 and constructed and arranged to engage the inner surface of the toe end portion of the upper and press the upper upwardly against the bottom surface of the wipers as hereinafter described. In the operation of the machine the head 170 moves heightwise of the upper relatively to the work support after a predetermined initial movement of the work support. During the initial movement of the head 170 the retarder 172 moves upwardly from its position illustrated in Fig. 18 into its position illustrated in Fig. 19 in which it is located in proximity to the bottom surface of toe wipers 174. During this initial movement of the retarder the head 170 swings the lower gripper jaw 144 in a clockwise direction to cause the jaws to close and grip the margin of the upper and thereafter swings the jaws and the arm 148 as a unit about the pin 150 to tension the upper 176 lengthwise thereof. Such movement of the arm 148 is resisted by a spring 178 one end of which engages a pin 180 on the arm 148 and the other end of which engages a pin 182 on the work support. When the machine is at rest the spring 178 holds the arm 148 in its position illustrated in Fig. 18, said position being determined by the engagement of a pin 184 projecting laterally from the arm 148 through a slot 186 in a link 188 pivotally mounted at 190 at the upper end of a fixed bracket 192. It will be seen that the spring 178 serves to maintain the initial position of the gripper assembly shown in Fig. 18 and also serves to effect the gripping action of the gripper jaws during the upper tensioning movement of the gripper assembly. At a predetermined stage in the upward movement of the work support the link 188 swings the arm 148 in a clockwise direction moving the toe gripper away from the head 170 and permitting the spring 166 to cause the gripper jaws to open and disengage the upper. Upon the completion of the upward movement of the work support the arm 148 will have swung outwardly away from the head 170 into its position illustrated in Fig. 20. In this position of gripper assembly the upper jaw 142 is located by engagement with the bottom surfaces of the toe wipers 174 and the lower jaw 144 is located by its engagement with a shoulder 194 formed in the arm 148. It will be understood that the toe gripper will not release its hold on the margin of the upper until the toe wipers 174 and the retarder 172 have engaged the upper between them with sufficient force to prevent any loss of the tension imparted to the upper by the toe grippers.

Referring to Fig. 10, the side gripper assemblies are mounted in a crosshead 196 in the lower portion of the work supporting column 62. These assemblies are similar in construction and inasmuch as the assembly on the right in Fig. 10 is illustrated in detail in the drawings this assembly will now be specifically described and it will be understood that the description applies equally well to the left assembly. Referring to Fig. 17, the crosshead 196 has outwardly extending lugs 198 which are bored to receive trunnions 200 projecting outwardly from parallel arms 202 and 204. The arm 202 is angular in shape and has a section 206 which is secured by a bolt 210 to an angular extension 208 of the arm 204. The section 206 converges toewardly relatively to the longitudinal axis of an upper mounted on the work support and provides a rail on which there is slidably mounted a carrier 212 which is vertically grooved to receive a slide 214 in the upper end of which there is formed the outer jaw of the gripper 138 at the right side of the machine. The slide is retained in the groove by a plate 215 secured to the carrier. The carrier is adjustable on the rail 206 by means of a hand screw 218 journaled in a bearing in the extension 208 of the arm 204 and held against endwise movement therein by a collar 220 secured thereto. The hand screw 218 has threaded engagement in a tapped bore in the carrier 212. Referring to Fig. 16, the slide 214 is provided with a square cut channel 222 extending from its upper extremity approximately two-thirds of the height of the slide. In the upper portion of said channel a gripper jaw 224 is pivotally mounted on a pin 226 and is connected by a link 228 to an operating slide 230 mounted in the channel 222. The slide 230 is actuated to close the gripper jaw by a spring 232 mounted in a bore 234 in the lower portion of the slide 214 and surrounding a stem 236 secured to the lower portion of the slide 230 and extending downwardly therefrom through a hole 237 in the slide 214 communicating with the bore 234. The stem 236 slides freely through a bore in the center of a plug 238 mounted in the threaded lower portion of the bore 234. The spring 232 is seated against the plug 238 and bears against a collar 240 on the stem 236 to impart upward movement to the slide 230. At its lower portion the slide 230 is retained within the channel 222 by the carrier 212 and at its upper portion it is retained within the channel by a gib 242 secured to the slide 214. When the machine is at rest the gripper jaws are held open by a latch member 244 pivotally mounted between parallel ears 246 of a plate 248, said ears extending into a slot 250 formed in the slide 230 and communicating with a groove 252 extending from said slot upwardly nearly to the top of the slide 230. The latch member 244 acts on a pin 254 carried by the slide 230 and extending through the groove 252. To facilitate the manual operation of the latch member 244 a handle 256 (Fig. 13) is secured thereto by screws 258. The side gripper is actuated to apply widthwise tension to an upper on the form by a spring 260 mounted on the cylindrical, lower end portion of the slide 214 and confined between a nut 262 on the threaded end portion of the slide and a washer 264 mounted on the slide and arranged to bear against the bottom face of the carrier 212. The spring 260 is loaded during the latter part of the downward movement of the carrier 212 at the end of the machine cycle after the downward movement of the slide 214 has been arrested by the engagement of a roll 266 with the upper surface of a plate 268 secured to the machine frame. As shown in Fig. 13, the roll 266 is pivotally mounted between lugs 270 projecting from a split clamp 272 secured to the lower extremity of the slide 214. When the machine comes to rest the carrier 212 is at the limit of its downward movement and the spring 260 is fully loaded. During that portion of the downward movement of the carrier 212 following the engagement of the roll 266 with the plate 268 the latch member 244 engages the pin 254 in the slide 230 and moves said slide downwardly to open the gripper jaws and the machine comes to rest with the gripper jaws wide open ready to receive the margin of an upper to be operated upon. Preparatory to the next succeeding cycle of the machine that portion of the margin of an upper at one end of the tip line is inserted into the gripper jaws and located heightwise by bringing the edge of the upper into contact with a locating pin 274 fixed in the jaw 216 and projecting laterally through an opening 276 in the jaw 224. After so locating the upper the latch handle 256 is operated to disengage the latch from the pin 254 whereupon the spring 232 (Fig. 16) imparts upward movement to the slide 230 thus closing the gripper jaws on the upper. When manual pressure on the handle 256 is released a spring 278 connecting the handle to the slide 214 swings the latch member 244 in a counterclockwise direction, as seen in Fig. 13, bringing the head 280 of the latch member into engagement with the pin 254. During the upward movement of the work supporting assembly in the next succeeding machine cycle the spring 260 expands to impart downward movement to the slide 214 thereby causing the side grippers to tension the upper widthwise over the toe form 30 and at the same time moving the pin 254 downwardly below the head 280 of the latch member 244 and permitting the spring 278 to swing the latch member in a counterclockwise direction into its position shown in Fig. 13. During the latter part of the downward movement of the carrier 212, after downward movement of the slide 214 is arrested by the engagement of the roll 266 with the plate 268, the latch member 244 engages the pin 254 and moves the slide 230 downwardly relatively to the slide 214 thereby opening the gripper jaws. When the machine is operated without an upper therein downward movement of the slide 214 relatively to the carrier 212 is limited by the engagement of the bottom end face of a plate 282 secured to the slide 214 with the upper surface of the carrier 212.

Mounted on the slide 214 and arranged to engage the inner surface of the margin of the upper adjacent to the tip line and between the tip line and the toe end of the upper, is an auxiliary presser member or retarder 284 (Fig. 14). Similarly to the retarder 172, illustrated in Fig. 18, the auxiliary retarder 284 (Fig. 14) turns the margin of the upper outwardly and presses it against the bottom surface of a toe wiper 174. The auxiliary retarder is herein illustrated as a head formed at the upper end of a slide 286 having a corrugated arcuate work engaging surface. As shown in Fig. 14 the retarder slide 286 is located in contiguous relation to a side face of the slide 214 and is guided for movement heightwise of an upper in the machine by a washer 288 on the pin 226 acting in a slot 290 (Fig. 15) in the slide 286 and a plate 292 secured to the slide 214 and acting in the slot 294 in the slide 286. The slide 286 is held against movement widthwise of the slide 214 by a nut 296 on the threaded end of the pin 226 and a retaining plate 298 secured to the slide 214 by headed screws 300 which also secure the plate 292. The auxiliary retarder is urged upwardly relatively to the slide 214 by a spring 302 arranged to bear against the bottom face of the outturned end portion 304 of the slide 286, said spring being mounted on a pin 306 fixed in an angle piece 308 secured by screws 310 to the carrier 212. The upper portion of the pin 306 extends freely through an opening in the outturned end portion 304 of the slide 286 and carries a nut 312 on its threaded upper end portion, said nut serving to limit upward movement of the slide 286 by the spring 302. At its lower end the spring 302 bears against a nut 314 which is adjustable on the pin 306 to vary the compression of the spring. The auxiliary retarder operates during the upward movement of the work support to press the outturned margin of the upper against the bottom face of the toe wiper positioned above it and serves to restrain movement of the upper stock between the wiper and the head of the retarder during the upper shaping operation. It will be understood that the illustrated machine is provided with two auxiliary retarders one at each side of the tip line portion of the upper and that the above description of the auxiliary retarder 284 applies equally well to the retarder at the opposite side of the upper. For adjusting the side gripper 138 widthwise of an upper in the machine the arm 204 is provided with an upward extension 316 (Fig. 10) which has pivotally connected to its upper end portion the bifurcated end of a link 318 the left end portion of which is longitudinally drilled and tapped to receive a screw 320 having a knurled head 322 which the operator turns to effect widthwise adjustment of the gripper. The screw 320 has an axial bore which is threaded with a left-hand thread to receive the threaded end portion of a link 324. As shown in Fig. 10 the link 324 is pivotally mounted on a pin 326 in the crosshead 66 of the work support, the crosshead being provided with a recess 328 which provides clearance for the slight vertical swinging movement of the link 324 incidental to the widthwise adjustment of the gripper. It will be seen in Fig. 10 that the crosshead 60 is of eccentric construction, having an extension to the left of the vertical axis of the work support greater than its extension to the right. Similarly the crosshead 196, which mounts the left side gripper, is of eccentric construction. This construction of the crosshead permits the angular disposition of the side gripper assemblies relatively to the longitudinal median line of an upper in the machine shown in Fig. 11. It will be understood that this arrangement of the gripper assemblies adapts them to handle left foot uppers. In the opposite station of the machine the side gripper assemblies will be offset to the right relatively to the longitudinally median line of an upper in the machine in order to adapt that station to operate on right foot uppers.

Figure 7:
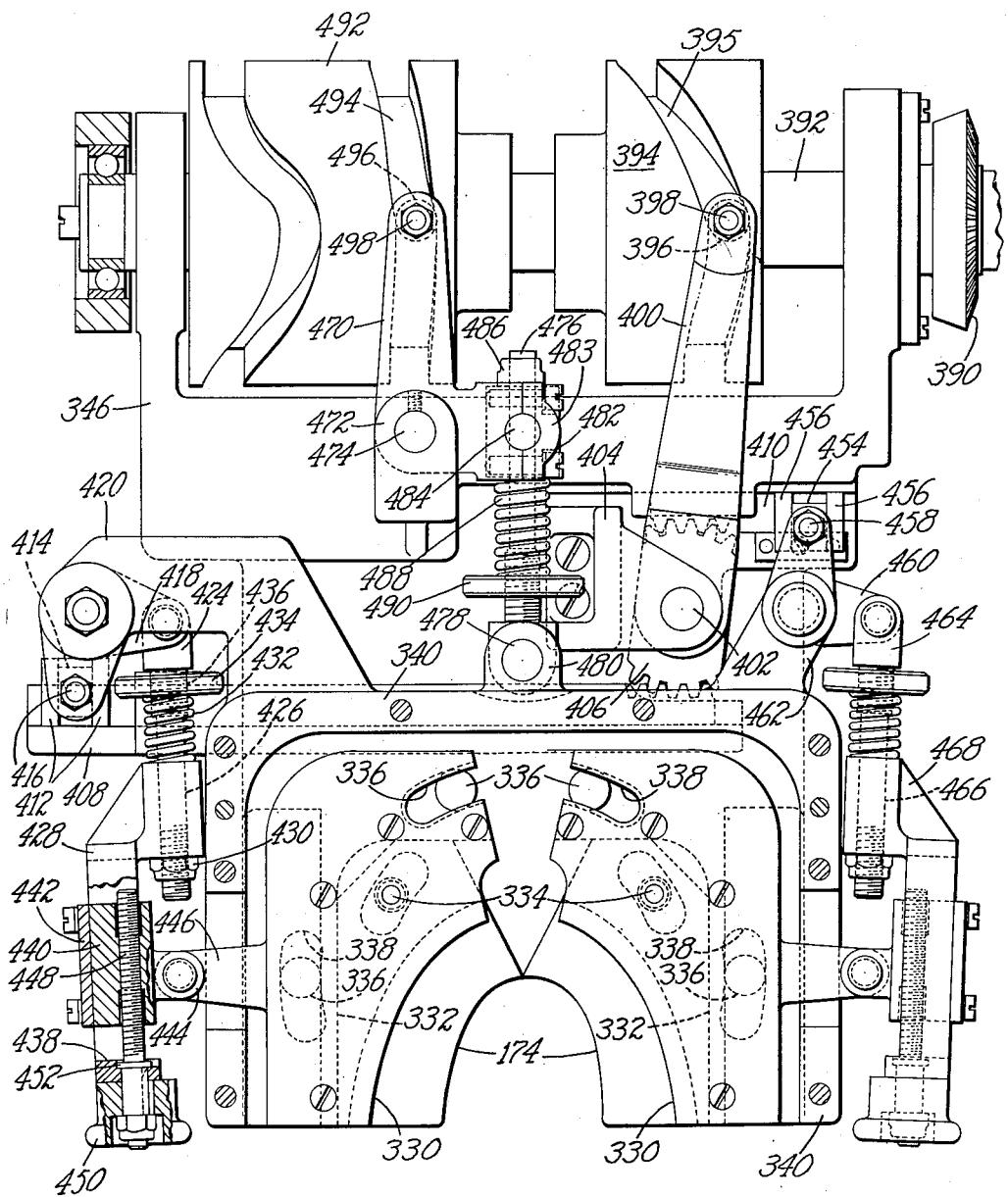
Fig. 7 is a view looking downwardly and rearwardly as in Fig. 3 illustrating the toe wipers and their operating mechanism.

For shaping a shoe upper over the toe form 30 the illustrated machine is provided with a pair of toe wipers 174 which, as illustrated in Fig. 7, are of a type commonly provided in toe lasting machines. This type of toe wiper is characterized by a meeting of the wiping edges at a common axis on which the wipers swing as they advance bodily in the upper shaping operation. In the illustrated machine the bodily advancement of the wipers is comparatively slight since the illustrated wipers have no overwiping movement but merely shape the upper about the peripheral portion of the form. The illustrated wipers 174 are mounted between the top and bottom plates of wiper carriers 330 and are seated in said carriers against edge faces 332 in which position they are retained by screws 334. See Fig. 6. The path of swinging movement of the wipers on their common axis is determined, as usual, in wiper assemblies of this type by rolls 336 mounted on a base plate 340 and acting in arcuate slots 338 in the wiper carriers 330. Referring to Fig. 4 the illustrated base plate is provided at opposite sides thereof with downwardly extending portions 342 which are rabbeted for sliding engagement with rails 344 formed in a bed plate 346 and the plate 340 is held against movement away from said rails by gibs 348 secured to the bottom faces of the extensions 342. Referring to Fig. 2 the bed plate 346 is mounted for swinging movement in bearings in standards in the upper end of the machine frame one of which is identified by the numeral 350. When the machine is at rest the wiper assembly, together with the trimming mechanism hereinafter described, all of which is mounted on the bed plate 346, is arranged in a horizontal position, as shown in Fig. 2, in which position the assembly is 45° removed in a clockwise direction from its operative position shown in Fig. 1. For swinging the bed plate 346 upwardly from its position in Fig. 1 into its position shown in Fig. 2 the illustrated machine is provided with a cam 352 mounted for turning movement with the shaft 124 and arranged to engage a roll 354 pivotally mounted at one end of a lever 356 freely mounted at its central portion on a shaft 358 and connected by a link 360 to a gear segment 362 which meshes with gear teeth 364 formed in the hub of an arm 366 mounted to swing on an axis 368 and connected by a link 370 to lugs 372 extending downwardly from the bed plate 346. The gear segment 362 is fixed to a shaft 374 which extends through to the opposite side of the machine frame and carries at its opposite end a gear segment (not shown) similar to the gear segment 362 and having connections to the bed plate 346 identical to the connections above described. These connections include a link 376 partially illustrated in Fig. 4 the bifurcated upper end portion of which is pivotally connected to a lug 378 projecting downwardly from the bed plate 346.

The illustrated wipers 174 are automatically actuated by cams mounted to rotate on an axis common to the axis of the bed plate 346. Referring to Fig. 1 said cams receive their operative movement from a bevel gear 380 mounted to turn with the cam shaft 124 and arranged to mesh with a bevel gear 382 fixed to a vertical shaft 384 journaled at its lower end in a bearing in a bracket 386 fixed to the right side wall of the machine frame and journaled at its upper end in a bearing in the standard 350. At its upper end the shaft 348 has fixed thereto a bevel gear 388 arranged to mesh with a bevel gear 390 fixed to a cam shaft 392 journaled at one end in a bearing in the standard 350 and at its opposite end in a bearing in a similar standard (not shown). Referring to Fig. 7 it will be seen that the cam shaft 392 provides the supporting means for the rear portion of the bed plate 346. Fixed to the shaft 392 is a cam 394 having formed therein a groove 395 in which is mounted a roll 396 pivotally mounted on a headed pin 398 depending from the free end of an arm 400 in the opposite end of which there is fixed a stud 402 which is journaled in a bracket 404 fixed to the bed plate 346. Mounted to turn with the arm 400 is a double gear segment 406 the forward teeth of which mesh with rack teeth formed in a slide 408 mounted in the bed plate 346 and the rear teeth of which mesh with rack teeth formed in a slide 410 mounted in the bed plate 346 and arranged parallel to the slide 408. At its left end as seen in Fig. 7 the slide 408 is provided with ears 412 between which there is slidably mounted a block 414 mounted to swivel on a pin 416 carried by one arm of a bell crank lever 418 pivotally mounted on arm 420 projecting rearwardly and outwardly from the base plate 340 in the toe wiper head. Pivotally mounted on the inwardly extending arm of the bell crank lever 418 is the head 424 of a rod 426 slidably mounted in a bore in an inwardly offset portion of a member 428, said member being located, longitudinally of the rod 426, between a nut 430 on the threaded end portion of the rod and a spring 432 surrounding the rod and positioned between the offset portion of the member 428 and a knurled nut 434 adjustably mounted on a threaded portion 436 of said rod. Slidably mounted in a slot 438 formed in the member 428 is a block 440 the inner portion of which is flanged and the outer portion of which has fixed thereto a gib 442 for holding the block against widthwise movement in the slot. The block 440 has inwardly extending lugs 444 between which there is pivotally mounted an arm 446 projecting outwardly from the wiper carrier 330 at the left side of the toe wiper head. In order to provide for angular adjustment of the toe wiper 174 in the left side of the toe wiper head a screw 448 is mounted in a tapped hole extending longitudinally of the block 440 and has secured to its forward end portion a head 450 which is manually operable to turn the screw 448 thereby to adjust the block 440 longitudinally relatively to the member 428. The screw 448 is held against longitudinal movement relatively to the member 428 by the head 450 which engages the forward end face of said member and a flange 452 formed in the screw 448 and seated in a counterbore formed in the member 428. For connecting the slide 410 to the wiper carrier 330 at the right side of the toe wiper head the illustrated machine is provided with mechanism substantially similar to the above-described mechanism for connecting the slide 408 to the left wiper carrier. This mechanism includes a block 454 slidably mounted in between ears 456 projecting from the slide 410 and mounted for swiveling movement on a pin 458 mounted in the rearwardly extending arm of a bell crank lever 460 pivotally mounted at the end of a short arm 462 projecting rearwardly from the right side portion of the base plate 340. Pivotally connected to the outwardly extending arm of the bell crank lever 460 is a head 464 of a rod 466 which is identical in construction to the rod 426 at the left side of the toe wiper head. The rod 466 is mounted in a member 468 corresponding to the member 428 at the left side of the toe wiper head. The connections between the member 468 and the wiper carrier 330 at the right side of the toe wiper head are identical to the connections from the member 428 to the wiper carrier 330 at the left side of the toe wiper head above described.

For advancing the toe wipers 174 bodily to bring them into engagement with the periphery of the upper at the center of its toe end a bell crank lever 470 is mounted between the bed plate 346 and an angular extension 472 of the bed plate arranged to overlie the bell crank lever and is pivotally mounted on a pin 474 extending between the bed plate and said angular extension. For connecting the bell crank lever to the toe wiper assembly a rod 476 has its headed forward end pivotally mounted on a pin 478 extending between lugs 480 formed in base plate 340 and is arranged to extend rearwardly from the pin 478 and through a block 482 mounted to swivel on a pin 484 in the bifurcated end portion of the short arm of the bell crank lever 470, said pin being fixed to the lever 470 by clamping plates, one of which is identified by the numeral 483. The rod 476 is positioned longitudinally relatively to the block 482 by a nut 486 mounted on its rear end portion and a spring 488 surrounding the rod and positioned between the block 482 and an adjustable knurled nut 490 mounted on the threaded forward portion of the rod. The bell crank lever 470 is actuated by a cam 492 fixed to the shaft 392 and provided with a groove 494 in which is mounted a roll 496 pivotally mounted on a pin 498 in the free end of the rearwardly extending arm of the bell crank lever 470. In the operation of the machine the bell crank lever 470 advances the toe wipers concomitantly with the operation of the arm 400 which closes the wipers, and these operations occur at an early stage in the upward movement of the work support. The advancement of the toe wipers is completed before the work support reaches the limit of its upward movement and during the latter part of such upward movement the wipers apply pressure to the toe portion of the upper, operating in conjunction with the retarder 172 and the auxiliary retarders 284 to shape the toe portion of the upper over the form 30.

For actuating the retarder 172 to turn the margin of the upper outwardly and press it upwardly against the bottom faces of the toe wipers a cam 500 (Fig. 2) is mounted to turn with the shaft 124 and is arranged to engage a roll 502 pivotally mounted at the end of the downwardly extending arm of a bell crank lever 504 pivotally mounted on the shaft 130 and connected by a link 506 to the downwardly extending arm of a bell crank lever 508 pivotally mounted between lugs 510 projecting forwardly from the panel 112. Pivotally mounted in the long arm of the bell crank lever 508 is a block 512 mounted for the swiveling movement on the lower end of a rod 514, said rod being held against endwise movement in the block by washers 515 and 517 secured to the rod. The rod extends upwardly through a central opening 516 (Fig. 12) in the cylindrical lower portion of the work support and is secured at its upper end to a downwardly extending portion 518 (Fig. 18) of the retarder head 172. The downward extension 518 is mounted in an opening in the bracket 152. This opening is characterized by rearwardly converging walls having secured thereto friction plates 520 (Fig. 11) and the downward extension 518 of the retarder head is constructed with rearwardly converging side faces arranged to bear against the friction plates. The downward extension 518 is pressed rearwardly against the friction plates 520 by a spring 522 (Fig. 18) mounted in a bore in the crosshead 60 of the upper portion of the work support and confined between a head 524 of a stem 525, said head being slidably mounted in a counterbore 526 in the crosshead 60 and arranged to engage the front face of the downward extension 518, and a screw plug 528 mounted in a threaded counterbore 530 in the crosshead 60 and provided with a screw driver slot to enable the operator to adjust it in order to vary the pressure of the spring 522. In the operation of the machine the cam 500 effects the full upward stroke of the retarder 172 at an early stage in the upward movement of the work support and then moves away from the roll 502 leaving the retarder held against downward movement by the engagement of its downward extension 518 with the friction plates 520. During the continued upward movement of the work support thereafter the retarder 172 turns the margin of the upper outwardly and presses it upwardly against the bottom face of the wiper with a force commensurate with the degree of pressure of the downward extension 518 against the friction plates 520.

In order to retain in the upper the shape imparted thereto by the upper shaping instrumentalities the toe portion of the upper may have incorporated therein a suitable stiffening element which is flaccid during the upper shaping operation but which will set sufficiently to retain the shape of the upper while the upper is held against the form by retaining instrumentalities hereinafter described. Various types of stiffening materials suitable for this purpose are available. Some of these stiffen upon the loss of heat while other types stiffen upon the application of heat thereto. The first-mentioned type is probably preferable since it obviates the use of heated molds in the machine. The cycle of each station of the illustrated machine has been timed with a view to the provision of an interval of sufficient duration between the completion of the upper shaping operation and the release of the upper retaining instrumentalities to permit the setting of the stiffening material.

During the interval between the completion of the upper shaping operation and the release of the upper retaining instrumentalities a rotary trimming cutter operates to sever the excess bottom marginal materials from the upper along a line which predetermines the registration of the upper with the insole or sock lining. The illustrated cutter automatically traverses the toe portion of the upper, traveling from that end of the tip line at the right side of the shoe in the machine to the opposite end of the tip line and then reversing its direction of movement and returning through the same path to its starting position. During the cutting operation the margin of the cutter extends into the groove 40 in the work supporing plate 38 as shown in Fig. 20, said groove providing clearance for the operation of the cutter.

Referring to Fig. 9 the illustrated trimming cutter is a thin disc 532 fixed to the lower end of a shaft 534 journaled in upper and lower ball bearings 536 and 538 mounted in a housing 540 at the left end of a slide 542. The illustrated cutter has cutting teeth generally similar to the teeth of a cross cut saw, said teeth being set sufficiently to obviate undue heating of the cutter by frictional engagement with the work. Referring to Fig. 4, the slide 542 has laterally extending tongues, one of which is identified in Fig. 4 by the numeral 544. Said tongues are mounted for sliding movement in grooves in a head 546 at the upper end of a shaft 548 (Fig. 9), said shaft being mounted for swiveling movement in a column 550 projecting upwardly from a base 552 (Fig. 5). For purposes of adjustment, as hereinafter explained, the base 552 is mounted for sliding movements in a groove 554 formed in a raised portion of a plate 556 secured by screws 558 (Fig. 6) to the upwardly extending side portions 560 of the base plate 340 of the wiper head. For adjusting the column 550 in the groove 554 a manually operated lever 562 is pivotally mounted between upward extensions 564 of the base 552 and has formed therein a gear segment 566 which meshes with a rack 568 secured by screws 570 to the base of the groove 554. For securing the column 550 in adjusted position, clamping screws 572 (Fig. 4) extend through slots in outwardly flanged portions of the base 552 and into tapped holes in the plate 556. The cutter 532 is operated by an electric motor 573 (Fig. 3), the casing of which is secured by screws 574 (Fig. 9) to an outwardly extending flange 576 of a housing 578. The shaft 580 of the motor, the lower end portion of which is shown in Fig. 9, is mounted in an axial bore in the head 582 of a shaft 584 and is secured therein by set screws 585. The shaft 584 is mounted in upper and lower ball bearings 586 and 588 mounted in the housing 578. Secured to the lower end portion of the shaft 584 is a V-belt pulley 590 which is operatively connected by a V-belt 592 to a smaller pulley 594 fixed to the upper end portion of the cutter shaft 534. In order to provide for such relative adjustments of pulleys 590 and 594 as may be required to effect adequate tension of the V-belt 592, the housing 578 is mounted for adjustive movement toward and from the pulley 594. To this end the housing 578 is provided with a tripodal mounting means having screw and slot connections to the slide 542, one of said connections being shown in Fig. 9 as a headed screw 596 extending through a slot 598 in a leg 600 projecting laterally from the base of the housing, said screw having threaded engagement in a tapped hole in a boss 602 projecting upwardly from the slide 542. Referring to Fig. 4 the second connection of the housing 578 to the slide 542 comprises a headed screw 604 extending upwardly through a slot (not shown) in a plate 606 mounted in a groove 608 in the slide 542, said screw extending upwardly into a tapped hole in a leg 610 extending downwardly from an offset portion of the housing 578. Referring to Fig. 3, the third connection of the housing 578 to the slide 542 comprises a headed screw 612 projecting upwardly through a slot 614 in an arm 616 projecting laterally from the slide 542, said screw having threaded engagements in a tapped hole in a leg 618 projecting laterally from the base of the housing 578.

In order to effect a movement of translation of the trimming cutter 532 thereby to transfer the point of operation of the cutter about the periphery of the toe portion of a shoe in the machine first from the right side of the shoe to the left side and then back to the point of beginning the illustrated machine is provided with a chain and sprocket mechanism. Referring to Fig. 9, the sprocket 620 is fixed to a shaft 622 mounted in a bearing at the right end of the slide 542. Keyed to the upper end portion of the shaft 622 is a relatively large bevel gear 624 which meshes with a small bevel gear 626 fixed to a shaft 628 mounted in a bearing formed in a head 632 at the end of an upward extension 634 of the slide 542. The shaft 628 is operated by the motor mounted on the housing 578. To this end the motor driven shaft 584 has formed therein a worm 636 constructed and arranged to mesh with a worm gear 638 (Fig. 8) mounted in a cylindrical extension 640 of the housing 578 and secured to a shaft 642. The worm gear 638 has a relatively large hub 644 which is journaled in a roller bearing 646 the inner race of which is secured by a clamping nut 648 to a shoulder formed by an enlarged portion of the hub 644 mounted on a threaded extension of the hub 644. Extending from the opposite side of the worm gear 638 is a relatively small hub 650 which is journaled in a roller bearing 652 the inner race of which is secured to a shoulder in the hub 650 by a clamping nut 654 mounted on a threaded extension of the hub 650. The outer race of the roller bearing 652 is mounted in a counterbore in a ring 656 and is retained in said ring by an annular plate 658. The ring 656 has an outwardly extending flange 660 which engages a machined surface formed in the outside of the housing and the ring 656 together with the plate 658 are secured to the housing by headed screws 662. It will be seen that the ring 656 and the plate 658 not only provide a mounting for the roller bearing 652 but also serve to hold the worm gear 638 against endwise movement relatively to the worm 636. For mounting the outer race of the bearing 646 a flanged ring 664 is secured by headed screws 666 to a machined surface of the housing. In order to accommodate the adjustive movement of the housing 578 the worm gear 638 and the bevel gear 626 are arranged for relative movement toward and from each other by mounting them upon separate shafts 642 and 628 respectively and operatively connecting them together by a coupling or sleeve 668 secured to the end portion of the shaft 642 by a pin 670 and mounted for sliding movement on the shaft 628. In order that the rotation of the shaft 642 will be transmitted to the shaft 628 two blocks 672 are secured in diametrically opposite positions to the shaft 628 for sliding movement in longitudinal slots 674 formed in the sleeve 668. The sprocket 620 meshes with a fixed chain one link of which is identified in Fig. 3 by the numeral 676. The sprocket is guided for meshing engagement with said chain by a roll 690 (Fig. 9) freely mounted on the headed lower end portion of the shaft 622 and arranged for translatory movement through a slot 692 formed in a plate 694 mounted on an elevated rearward extension 696 of the plate 556 which forms the top of the wiper head. The chain is fixed to a plate 678 which together with plate 694 is secured to the extension 696 by headed screws 700 (Fig. 5). As shown in Fig. 3 the plate 678 is characterized by an edge face 680 which for the greater part of its length is uniformly spaced relatively to the outer wall of the slot 692. The chain is mounted on the plate 694 and arranged in abutting relation to the edge face 680 of the plate 678. For securing the chain in said position the links carry T-shaped plates 686 the heads of which overlie the links and are connected thereto by the link pins 684 while the tail portions of said plates extend outwardly over the plate 678 and are secured thereto by rivets one of which is identified by the numeral 688. In order to hold the sprocket 620 against endwise movement relatively to the chain a retaining plate 698 is mounted on an intermediate plate 699, said intermediate plate together with the retaining plate being secured to the extension 696 by headed screws 701. Referring to Fig. 3 it will be seen that the edge face 709 of the retaining plate and the edge face 705 of the intermediate plate are uniformly spaced relatively to the slot 692 and to the edge face 680 of the plate 678. As shown in Fig. 3 the forward extremities of the edge face 680 extend forwardly and outwardly as do also the end portions of the chain. The left end portion of the slot 692 also extends forwardly and outwardly to permit the trimming assembly to come to rest in its position illustrated in Fig. 3 in which position the trimming cutter is spaced away from the upper in the machine thus permitting swinging movement of the wiper head from its position shown in Fig. 1 into its retracted or elevated position shown in Fig. 2. The slot 692 is so constructed and arranged that the movement of translation of the sprocket causes the trimming cutter to move about the toe portion of an upper in the machine from one end of the tip line to the opposite end thereof with the edge of the cutter extending through the upper materials and into the clearance groove 40 formed in the plate 38. The cutter operates within the groove 40 during its advancing movement and during the greater part of its return movement, moving out of said groove and away from the upper as it approaches the limit of its return movement.

When it is desired to change the work supports for operation on shoes of a different width the toe form 30 is removed from the machine by lifting it off the pins 36 (Fig. 11) projecting upwardly from the plate 38 and the screws 42 are removed to permit the plate 38 to be lifted off the head of the work supporting column and replaced by another plate of the required width. The new plate will be provided with pins corresponding to the pins 36 for locating an appropriate toe form. It will be understood that when the plate 38 is replaced by a plate of a different width the path of movement of the trimming cutter must be altered to cause it to travel in the groove 40 in the substituted plate. Such adjustment of the path of movement of the cutter is effected by first releasing the clamping screws 572 (Fig. 4) which clamp the base 552 to the top plate 556 and then operating the lever 562 (Fig. 5) to adjust the column 550 toward or from the toe end of the form 30. Such adjustment of the column 550 changes the location of the axis on which the cutter assembly swings during the movement of translation of the cutter, thereby altering the path of movement of the cutter. It will be understood that in changing from a relatively wide shoe to a relatively narrow shoe the lever 562 will be operated in a counterclockwise direction as seen in Fig. 5 to move the column 550 away from the form 30 thereby shortening the distance between the column and the roll 690 (Fig. 9) and increasing the lateral movement of the cutter. Conversely, when changing from a relatively narrow shoe to a relatively wide shoe the lever 562 will be operated in a clockwise direction as seen in Fig. 5, moving the column 550 toward the form 30 thereby reducing the lateral movement of the cutter.

It will be understood that the provision of a toe form 30 separate from the plate 38 reduces the number of such plates required by permitting the use of a single plate for all forms having substantially the same bottom pattern.

In order to clamp the upper against the form 30 so that it will be securely held for the trimming operation, the illustrated machine is provided with upper retaining means herein illustrated as a pair of spring fingers 702 and 703 (Fig. 3) constructed and arranged to apply pressure to opposite sides of the toe portion of the upper thereby to clamp the upper against the form 30 with sufficient force to prevent any movement of the upper relatively to the form, and particularly, to prevent any contraction or spring back of the upper at the trimming point as the body portion of the upper is separated from the margin and, consequently, is no longer held in position by the grippers or the wipers. To provide for the mounting of the spring finger 702 at the left side of the upper, as seen in Fig. 3, said finger has an outwardly turned extension 704 which is secured to an arm 706 by screws 708 (Fig. 4). To provide for the adjustment of the spring finger 702 toward and from the spring finger 703 for operation on shoes of different widths the arm 706 has an upwardly extending hub 710 having a stem 712 extending upwardly therefrom through a bore in the forward end portion of a lever 716. The stem 712 has an upper portion of reduced diameter projecting above the top surface of the lever 716 and threaded to receive a clamping nut 718. The force exerted against the arm 706 when the spring finger 702 is brought to bear against the work is taken by an adjustable stop screw 720 mounted in a tapped hole in an angular extension 714 of the arm 706 and arranged to abut a forward extension 715 of the lever 716. A locked nut 722 secures the screw 720 in adjusted position. To provide for swinging movement of the lever 716 on an axis extending heightwise of an upper in the machine, said lever has mounted therein a pivot pin 724 the downwardly extending portion of which has a bearing in the plate 556 and the upwardly extending portion of which has a bearing in a plate 726 secured by screws 728 to a rib 730 projecting upwardly from the plate 556. The lever 716 receives its operation from a cam lever 732 pivoted at 734 on the wiper head and carrying at its rear end a roll 736 mounted in a groove 738 in the cylindrical cam 492 secured to the shaft 392. At its forward end the cam lever 732 is bifurcated and has mounted therein for swiveling movement a trunnion block 742 which is longitudinally bored to receive a short sliding shaft 744 the right end of which carries a bifurcated head 746 in which a rocker lever 748 is pivotally mounted. In the operation of the machine the cam lever 732 swings in a clockwise direction bringing the trunnion block 742 to bear against a spring 750 mounted on the shaft 744 and positioned between the trunnion block and a head 752 at the left end of said shaft. The forwardly extending portion of the rocker lever 748 is pivotally connected at 754 to the lever 716 and the rearwardly extending portion thereof is pivotally connected to a link 756 which in turn is pivotally connected at its right end to the rearwardly extending portion of a rocker lever 758 pivotally mounted at 760 on the plate 556. The forwardly extending portion of the rocker lever 758 is connected by a link 762 to the rear end of a lever 764 which is the companion of the lever 716 and carries the spring finger 703 which bears against the right side of the upper. At its forward end the lever 764 has a downwardly offset portion 765 which extends inwardly toward the work supporting form 30 in the same manner as the arm 706 at the left side of the machine. Two screws 767 secure the presser member 703 to the offset portion 765. There is no provision for adjustment of the presser member 703 relatively to the lever 764. The adjustment of the presser member 702 at the left side of the machine is all that is required to arrange the presser members to operate on different widths of shoes.

Figure 21:
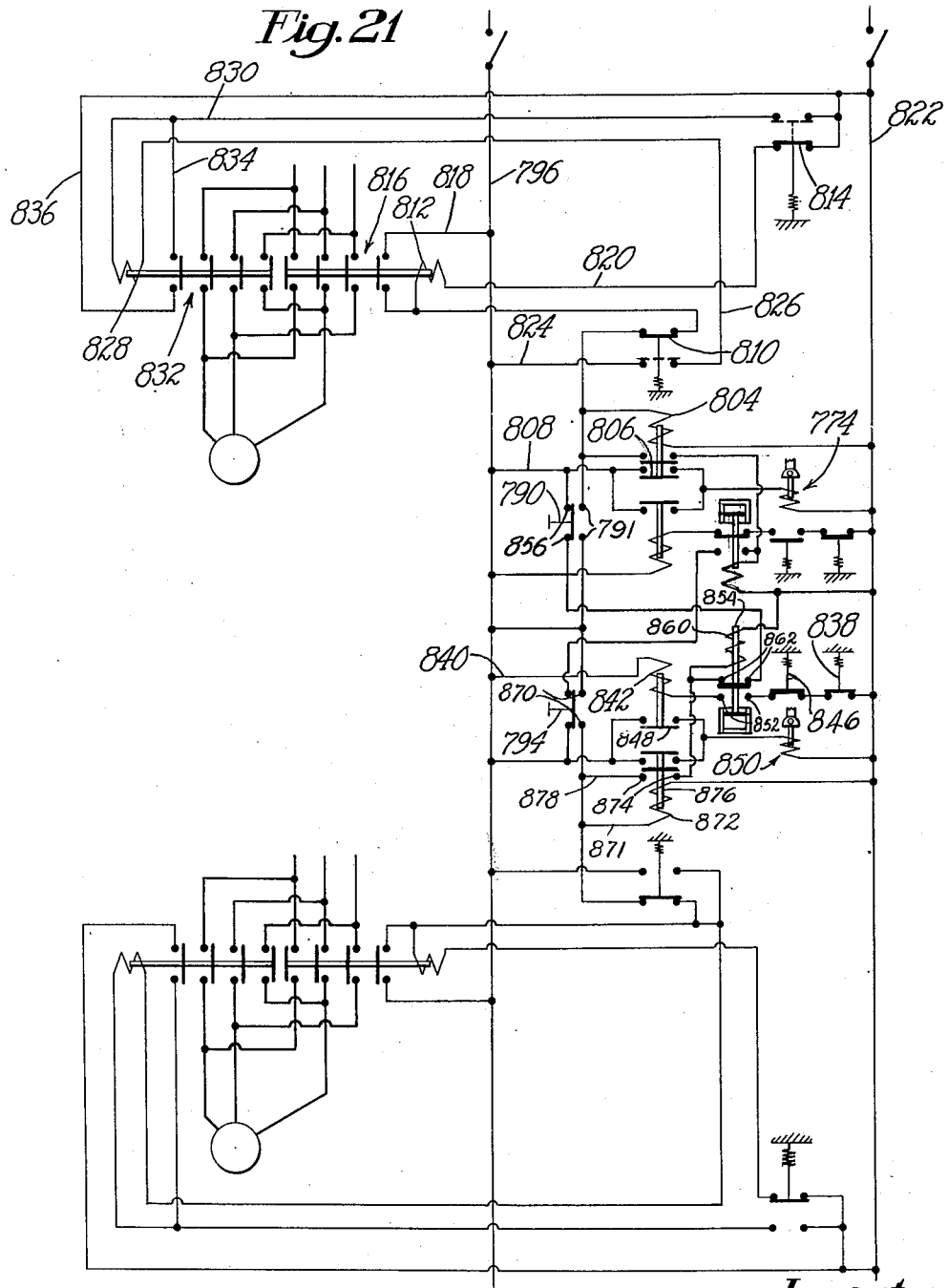
Fig. 21 is an electrical diagram.
Figure 22:
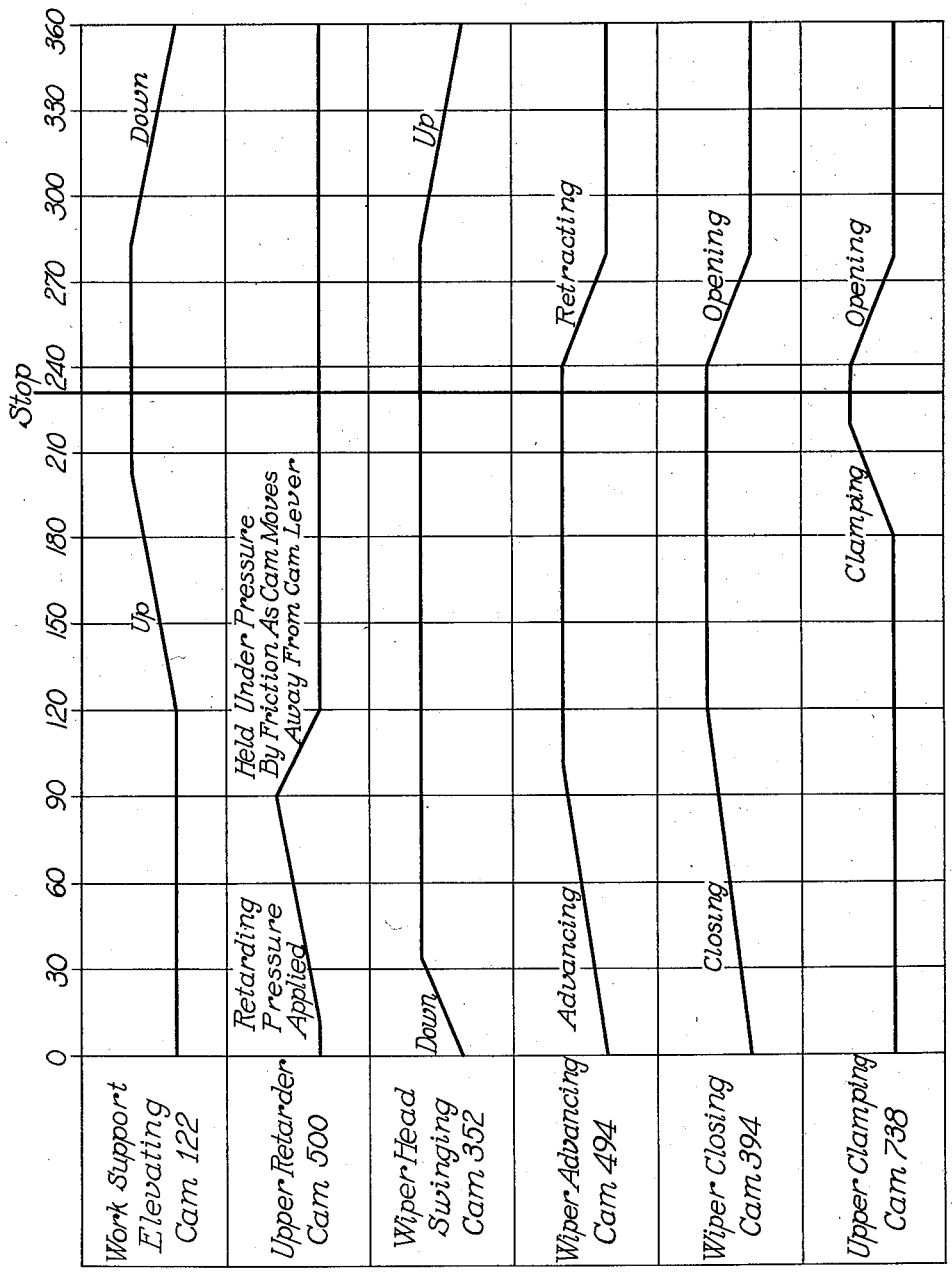
Fig. 22 is a cam chart.

For initiating the operation of the illustrated machine push button switches 790 and 794 Fig. 21 are provided. The operation of push button switch 790 initiates the operation of the clutch 772 in the left station of the machine, hereinafter referred to as station one, causing the upper stretching and shaping instrumentalities in that station to perform their respective functions and come to rest with the grippers closed on the upper and the wipers in their position indicated in Fig. 20 in which they have completed their wiping operation and are applying pressure to that portion of the upper below and adjacent to the groove 40 in the plate 38. The operation of the switch 790 also initiates the trimming operation in the right station of the machine, hereinafter referred to as station two. Upon the completion of the trimming operation in station two the upper stretching and shaping instrumentalities in that station automatically disengage the work and return to their respective starting positions without any further action on the part of the operator. In the normal operation of the machine the push button switch 790 will be operated with an upper in station one engaged by the side grippers 138 and awaiting the upper shaping operation, and an upper in station two, which has been shaped and is held by the operating instrumentalities awaiting the trimming operation.

Referring now to the wiring diagram (Fig. 21) let it be assumed that an upper to be operated upon has been placed in station one and that an upper in station two has been shaped and is awaiting the trimming operation. It will be understood that under these circumstances the wiper head in station one is swung upwardly, as shown in Fig. 2, while the wiper head in station two is in its downwardly swung or operating position illustrated in Fig. 1. In order to actuate the upper shaping instrumentalities in station one and the upper trimming cutter in station two, the push button switch 790 is depressed to close a circuit through the main line 796 and through the poles 791 of the switch 790. Current passing through the switch 790 energizes a coil 804 to close a switch 806. The closing of the switch 806 closes a circuit through a line 808 to the clutch solenoid 774. The energizing of the solenoid effects downward movement of a latch member 778 (Fig. 1) which causes the operation of the clutch 772 and the initiation of the first part of the machine cycle in station one. During the first part of the machine cycle the grippers and the wipers operate to shape the upper over the form and the machine comes to rest with the side grippers still holding the upper and the wipers in their position illustrated in Fig. 20.

The closing of the push button switch 790 also closes a circuit in station two extending through a switch 810, a coil 812, and a switch 814 energizing the coil 812 and closing an eight pole switch 816. Referring now to Fig. 3 the switch 810 is held in its position illustrated in Fig. 21 by an arm 768 bearing against the stem of the switch and acting against a spring incorporated in said switch. The switch 814 is maintained in its position illustrated in Fig. 21 by a spring incorporated therein. The closing of the switch 816 starts the trimming motor in station two and also closes a holding circuit which causes the coil 812 to remain energized until the cutter has completed its trimming operation. The holding circuit flows through a line 818 to the switch 816 and through said switch, the coil 812, and a line 820 to the switch 814. The switch 814 being closed by the spring incorporated therein, the current flows through it to a line communicating with the main line 822. Upon the completion of the operation of the trimming cutter an arm 770 (Fig. 3) fixed to the cutter slide engages the stem of the switch 814, opening the holding circuit through the line 820. The circuit through the push button switch 790 to the coil 812 having previously been opened by the spring incorporated in the switch 810 when the arm 768 moved away from said switch, the operating movement of the cutter comes to rest when the arm 770 engages the stem of the switch 814. When the arm 768 moves away from switch 810 the spring incorporated in said switch returns it to its position indicated by dotted lines in Fig. 21. The engagement of the arm 770 with the stem of the switch 814 at the completion of the operating movement of the trimming cutter moves said switch into its position indicated by dotted lines in Fig. 21 and closes a circuit through the main line 796, a line 824, and the switch 810 and a line 826 to a coil 828 and through said coil to a line 830 communicating with the switch 814. The energizing of the coil 828 closes an eight pole switch 832 thereby starting the trimming cutter motor in reverse and returning the cutter to its starting position. As the arm 770 moves away from the switch 814 the spring incorporated in said switch returns it to its normal position illustrated in Fig. 21 but the coil 828 is maintained energized by a holding circuit extending through a line 834 and through the switch 832 to a line 836 connected to the main line 822. When the trimming cutter reaches the starting position the arm 768 engages the stem of the switch 810 returning said switch to its position indicated by full lines in Fig. 21, thus opening the circuit through the coil 828. Thereupon a spring incorporated in the switch 832 opens said switch and the trimming motor stops, causing the cutter to come to rest in its starting position. As the cutter completes its return movement to its starting position the arm 770 fixed to the cutter slide engages the stem of a switch 838 operating said switch to close a circuit through a coil 842, The energizing of the coil 842 operates a switch 848 to close a circuit through a clutch solenoid 850 in station two thereby initiating in that station the final stage of the machine cycle in which the operating instrumentalities are retracted from the upper and the wiper head is swung upwardly into its position shown in Fig. 2. In order to obviate the operation of the clutch solenoid 850 in station two except at the end of the trimming cycle in that station the circuit through the coil 842 extends not only through the switch 838, but also through a switch 846 which is closed by the downward movement of the wiper head in station two and through a time delay switch 854. When the machine comes to rest at the end of the upper shaping cycle in station two the switch 854 is held in contact with the poles 862, against the action of a spring incorporated therein, by a coil 860 which, at that time, is activated by a holding circuit extending through the poles 856 of the push button switch 790. When the push button switch is operated to start the upper shaping cycle in station one and the trimming cycle in station two the circuit through the coil 860 is broken and the spring incorporated in the switch 854 closes said switch against the poles 852. The closing of said switch is delayed in any known manner in order that the switch 838 will open before the switch 854 has closed against the poles 852. Referring to Fig. 3 the switch 838 is opened by the spring incorporated therein at the beginning of the operation of the trimming cutter in station two when the arm 770 moves away from the stem of the switch. As the cutter assembly comes to the limit of its return movement after the trimming operation has been completed, the arm 770 engages the stem of the switch 838 closing said switch and thereby closing the circuit through the coil 842 thus activating said coil to close the switch 848 in order to activate the clutch solenoid 850. The coil 860 is activated to return the switch 854 to its position shown in Fig. 21 when the push button switch 794 is operated to start the upper shaping cycle in station two. The operation of the push button switch closes a circuit through the poles 870 and the line 871 activating the coil 872 to close the switch 876. The operation of the switch 876 closes a circuit through the line 878 and the poles 874 to the coil 860. The holding circuit hereinbefore described retains the switch 854 in its position shown in Fig. 21 until the push button switch 790 is again operated.

The operation of the upper shaping cycle in station two and the trimming and release cycle in station one is initiated by the operation of the push button switch 794. The wiring of the clutch solenoid in station two and the motor for the trimming cutter in station one is substantially the same as the wiring of the clutch solenoid in station one and the motor for the trimming cutter in station two and will be understood from the foregoing description.

It will be understood that the organization of the electrical controls above described calls for the alternate operation of the two stations, and one station cannot be operated independently of the other.

In the operation of the illustrated machine an upper such as the upper 780, illustrated in Fig. 3, is mounted on the work supports 30 and 32 in either station of the machine. For the purpose of description let it be assumed that the upper is mounted on the work supports in station one. The illustrated upper is characterized by a closed toe and by an open heel which, as shown in Fig. 4, consists of a strap 782 which is mounted in a suitable recess provided in the heel form 32. The bottom margin of the upper at opposite sides of its tip-line portion is notched or, alternatively, has an offset formed therein to enable the operator to position the upper lengthwise thereof in accurately predetermined relation to the side grippers 138. The upper is located heightwise thereof in the side grippers by bringing the edge of its bottom margin into contact with the upper locating pin 274 (Fig. 13) mounted in the gripper jaws. In locating the upper in the machine the operator inserts the bottom margin at one end of the tip line into the side gripper jaws and operates the hand lever 256 to cause the jaws to close on the margin of the upper. Similarly, the bottom margin at the opposite side of the tip line portion is then inserted into the opposite side gripper jaws which are thereupon closed on the upper margin. The heel strap 782 is then arranged to be positioned in the recess in the heel form 32 and the heel form is moved forwardly away from the toe form until it engages the strap 782 and holds its taut as shown in Fig. 4. The heel form is held against return movement by the pawl 52 shown in Fig. 3. The operator now presses the push button switch 790 to cause the machine to stretch and shape the toe portion of the upper over the form 30. Upon the completion of the upper shaping cycle in station one another upper is mounted on the work supports in station two in the manner above described and the operator then presses the push button switch 794 to cause the machine to perform the trimming operation in station one and the stretching and shaping operation in station two. Upon the completion of the trimming operation in station one the operating instrumentalities have been disengaged from the upper and the wiper head has swung upwardly into its retracted position shown in Fig. 2. By the time the operating instrumentalities are disengaged from the shoe the stiffening material in the toe portion of the upper will have set to retain the shape imparted to the upper by the machine and the upper with its toe thus permanently molded is removed from the machine and another upper to be operated upon is mounted on the work supports in station one and positioned in the side grippers as above described. It will be understood that any suitable toe stiffening means may be provided for retaining the shape imparted to the toe portion of the upper. If a thermoplastic means is employed a suitable means is provided for applying the necessary heat to the toe portion of the upper to render the stiffening means flaccid for the duration of the upper shaping operation.

If a thermosetting stiffening means is employed suitable means is provided for applying the necessary heat to the toe form 30 to cause the stiffening means to set during the interval between the upper shaping operation and the removal of the upper from the machine. In the operation of the illustrated two station machine this interval is always of ample duration to permit the stiffening means to set since it is during this interval that an upper which has been shaped and trimmed is removed from the machine and another upper to be operated upon is placed on the work supports. The time required for these manual operations is substantially greater than the time required for thermosetting a stiffening means.

If it is desirable to obviate the use of heat in connection with the provision of a stiffening means in the toe portion of the upper, a stiffening means which sets upon the evaporation of a solvent or upon chemical action may be employed.

Having thus described my invention what I claim as new and desire to secure by Letters Patent of the United States is:

1. In a machine for shaping shoe uppers, a shoe form, a member on which said form is mounted, means mounting said member for angular movement on an axis extending heightwise of a supported upper and coinciding with the toe extremity of the upper, wiping means, a retarder constructed and arranged to cooperate with said wiping means, and means mounting said retarder for angular movement on an axis common to the axis above described.

2. In a machine for shaping shoe uppers, means for supporting and shaping a shoe upper comprising a form, a member on which said form is mounted, means mounting said member for angular movement on an axis extending heightwise of a supported shoe and coinciding with the toe extremity of the shoe, a wiper, a retarder constructed and arranged to cooperate with said wiper, means mounting said retarder for angular movement on an axis common to the axis above described, a pair of side grippers carried by the member which mounts the form, and a toe gripper carried by said member.

3. In a machine for shaping shoe uppers, a work supporting and shaping form, means for wiping the upper against the form, means for pressing the upper heightwise thereof against the wiping means, friction means, and means for effecting relative movement of the pressing means and the friction means into mutual engagement thereby to resist relative heightwise movement of the pressing means and the form.

4. In a machine for shaping shoe uppers, a work supporting and shaping form, means for wiping the upper against the form, means for pressing the upper against the wiping means, friction means, and means for effecting rectilinear movement of the pressing means and the friction means into mutual engagement thereby to resist relative heightwise movement of the pressing means and the form.

5. In a machine for shaping shoe uppers, a work supporting and shaping form, a member on which said form is mounted, means for mounting said member for movement heightwise of a shoe on the form, means for wiping the upper against the form, means for pressing the upper against the wiping means, friction means mounted on said member, and means for effecting relative movement of the pressing means and the friction means into mutual engagement thereby to resist relative heightwise movement of the pressing means and the form.

6. In a machine for shaping shoe uppers, wipers for pressing an upper against a form, means for pressing the upper against the wipers, and means for applying friction to the pressing means in order to resist relaxation of the pressure of the upper against the wipers.

7. In a machine for shaping shoe uppers over forms, wipers for wiping an upper heightwise of a form, a retarder for pressing the outturned margin of the upper against the wipers, and means for applying friction to the retarder in order to resist relaxation of the pressing action of the retarder against the upper.

8. In a machine for shaping uppers over forms, wipers for wiping an upper heightwise of a form, a retarder for pressing the outturned margin of the upper against the form, power operated means for effecting rectilinear movement of the retarder in one direction heightwise of a shoe in the machine, and friction means for resisting rectilinear movement of the retarder in the opposite direction.

9. In a machine for shaping uppers over forms, upper tensioning means comprising a pair of gripper jaws, a wiper for wiping an upper heightwise of a form, a retarder constructed and arranged to press the outwardly flanged margin of the upper against the wiper, and means operated by movement of the retarder for first closing the gripper jaws on the upper and then moving the jaws bodily to tension the upper.

10. In a machine for shaping uppers over forms, upper tensioning means comprising a pair of gripper jaws, a wiper for wiping an upper heightwise of a form, a retarder constructed and arranged to press the outwardly flanged margin of the upper against the wiper, a cam member mounted on the retarder and operative during movement of the retarder first to close the jaws on the upper and then to move the jaws bodily to tension the upper.

11. In a machine for shaping uppers over forms, a member for mounting an upper shaping form, upper tensioning means comprising a pair of gripper jaws, a cam movable heightwise of an upper in the machine first to close the gripper jaws on the upper and then to move the jaws bodily to tension the upper, and means operated by movement of said member heightwise of the upper to move the gripper jaws out of contact with said cam.

12. In a machine for shaping uppers over forms, a member constructed and arranged to mount an upper shaping form, upper tensioning means comprising a pair of gripper jaws, a wiper for wiping an upper heightwise of a form mounted on said member, a retarder for pressing the outwardly flanged margin of the upper against the wiper, a cam member mounted on said retarder, means for actuating said retarder and causing said cam member first to close the gripper jaws on the upper and then to move the jaws bodily to tension the upper, and means operated by movement of the form supporting member heightwise of the upper for moving the gripper jaws out of contact with said cam member.

13. In a machine for shaping uppers over forms, upper tensioning means comprising a pair of gripper jaws one of which is spring biased to a predetermined open position while the other is freely mounted for opening and closing movements, a pivotally mounted arm on which said jaws are mounted, a cam member constructed and arranged to impart closing movement to said freely mounted jaw, a spring arranged to move said arm toward the cam member, and means for operating said arm to move said freely mounted jaw out of contact with said cam member.

14. In a machine for shaping upper over forms, upper tensioning means comprising a bar, a carrier in which said bar is slidably mounted, a gripper jaw formed at one end of said bar, a cooperating gripper jaw pivotally mounted in said bar for opening and closing movements, a slide carried by said bar and movable relatively to both gripper jaws to close said jaws, a spring for actuating said slide, a latch acting on said slide to control its jaw-closing movement, and means carried by said bar and constructed and arranged to impart a movement of translation thereto.

15. In a machine for shaping uppers over forms, upper tensioning means comprising a bar, a carrier in which said bar is slidably mounted, means for operating the carrier to impart a movement of translation to the bar without altering its angular relation to an upper in the machine, a gripper jaw formed at one end of said bar, a cooperating gripper jaw mounted in said bar for opening and closing movements, a slide carried by said bar and constructed and arranged to close said gripper jaws, and means for imparting a movement of translation to said bar comprising a compression spring carried by said bar and acting against said carrier.

16. In a machine for shaping uppers over forms, upper tensioning means comprising a bar, a carrier in which said bar is slidably mounted, a gripper jaw formed at one end of said bar, a cooperating gripper jaw mounted in said bar for opening and closing movements, a slide carried by said bar and constructed and arranged to close said gripper jaws, means for moving the bar relatively to the carrier comprising a compression spring mounted on the bar and acting against the carrier, an abutment member, and means for actuating the carrier to bring the bar into engagement with the abutment member and thereafter to energize said spring.

17. In a machine for shaping uppers over forms, upper tensioning means comprising a bar, a gripper jaw formed at one end of said bar, a cooperating gripper jaw mounted in said bar for opening and closing movements, a carrier for said bar, a bracket on which said carrier is mounted for adjustive movement generally lengthwise of an upper in the machine, and a member on which said bracket is mounted for swinging movement to effect movements of the gripper jaws toward and from an upper in the machine.

18. In a machine for shaping uppers over forms, upper tensioning means comprising a bar, a gripper jaw formed at one end of said bar, a cooperating gripper jaw mounted in said bar for opening and closing movements, a carrier for said bar, a bracket on which said carrier is mounted for adjustive movement generally lengthwise of an upper in the machine, a hand screw mounted in the bracket and constructed and arranged to impart such adjustive movements to the carrier, and a member on which said bracket is mounted for swinging movement to effect movements of the gripper jaws toward and from an upper in the machine.

19. In a machine for shaping uppers over forms, upper tensioning means comprising a bar, a gripper jaw formed at one end of said bar, a cooperating gripper jaw mounted in said bar for opening and closing movements, a carrier in which said bar is mounted for translatory movements, a bracket on which said carrier is mounted for sliding movement in a rectilinear path converging relatively to the longitudinal median line of an upper mounted in the machine, and means for effecting such sliding movement of the carrier.

20. In a machine for shaping uppers over forms, upper tensioning means comprising a bar, a gripper jaw formed at one end of said bar, a cooperating gripper jaw mounted in said bar for opening and closing movements, a carrier in which said bar is mounted for translatory movements, a bracket on which said carrier is mounted for sliding movement in a rectilinear path converging relatively to the longitudinal median line of an upper mounted in the machine, means for effecting such sliding movement of the carrier, and a member in which said bracket is pivotally mounted for swinging movement in a direction to effect movements of the gripper jaws toward and from the upper.

21. In a machine for shaping uppers over forms, a work support providing a mounting for a shoe form, means for effecting movements of said work support heightwise of a form mounted thereon, two brackets mounted for swinging movement at opposite sides of said work support, two carriers mounted in said brackets respectively for adjustive movement generally lengthwise of an upper in the machine, and two grippers mounted in the carriers respectively.

22. In a machine for shaping uppers over forms, a work support providing a mounting for a shoe form, means for effecting movements of said work support heightwise of a form mounted thereon, two brackets mounted for swinging movement at opposite sides of said work support, two carriers mounted in said brackets respectively for adjustive movement generally lengthwise of an upper in the machine, two grippers mounted in the carriers respectively, and means for swinging the brackets individually to effect adjustive movements of the respective grippers toward and from the upper.

23. In a machine for shaping uppers over forms, upper tensioning means comprising a bar, a gripper jaw formed at one end of said bar, a cooperating gripper jaw mounted in said bar for opening and closing movements, a carrier in which said bar is mounted for translatory movement, a slide mounted in said bar, means actuated by said slide for imparting opening and closing movements to the movable gripper jaw, means for actuating said slide to close the movable gripper jaw, and a latch for holding the slide against such jaw-closing movement.

24. In a machine for shaping uppers over forms, upper tensioning means comprising a bar, a gripper jaw formed at one end of said bar, a cooperating gripper jaw pivotally mounted in said bar for opening and closing movements, a carrier for said bar, a slide carried by the bar, means operatively connecting the slide to the movable gripper jaw, a latch member mounted on the carrier and constructed and arranged to hold the slide against gripper closing movement, a latch engaging member mounted in the slide, and means mounted on the bar and acting against the carrier to impart translatory movement to said bar.

25. In a machine for shaping uppers over forms, a work supporting member constructed and arranged to mount an upper shaping form, two grippers mounted at opposite sides of an upper in the machine, two carriers mounting the grippers respectively, means mounting the carriers on the work supporting member, means for imparting upper tensioning movement to each of the grippers comprising a spring carried by the gripper and acting against the carrier, and means for arresting movement of the grippers with the carrier and causing the springs to be energized during continued movement of the carrier after the grippers have been so arrested.

26. In a machine for shaping uppers over forms, a pair of upper shaping wipers, a swinging head in which said wipers are mounted, said head being mounted for movement between a predetermined wiping position and a position remote from an upper in the machine, and wiper actuating mechanism including a cam mounted to rotate on an axis coincidental with the axis of swinging movement of the head.

27. In a machine for shaping uppers over forms, a support for a form, a pair of wipers constructed and arranged for closing movement on an upper mounted on a form carried by said support, means for moving the support heightwise of the upper while the wipers are closed on the upper to cause the upper to be shaped over the form, means for mounting the wipers comprising a head mounted for swinging movement on an axis extending widthwise of the upper to advance the wipers from a position remote from the upper to a predetermined lasting position, and wiper actuating means including a cam mounted to rotate on an axis coincidental with the axis of swinging movement of the head.

28. In a machine for shaping uppers over forms, a pair of lasting wipers, and means for actuating said wipers comprising a cam, a cam lever, a gear actuated by said lever, two racks meshing with said gear and arranged to receive opposite movements therefrom, and connections from said racks for operating the wipers respectively.

29. In a machine for shaping uppers over forms, a pair of lasting wipers, means for actuating said wipers comprising a cam, a lever actuated by said cam, a gear actuated by said lever, two racks actuated by said gear, connections from said racks for operating the wipers respectively, and means for adjusting the wipers individually in their respective paths of operating movement comprising manually operated screws incorporated in the connections from the racks for operating the wipers.

30. In a machine for shaping uppers over forms, a pair of lasting wipers, a slide in which said wipers are mounted for opening and closing movements, cam operated mechanism for actuating the slide to move the wipers bodily toward and from an upper in the machine, and means for closing said wipers comprising a cam, a lever actuated by said cam, and rack and gear mechanism actuated by said lever.

31. In a machine for shaping uppers over forms, an upper trimming cutter, a carrier in which said cutter is mounted for rotary movement, an actuator, connections from said actuator for rotating said cutter, other connections from said actuator for imparting a movement of translation to said carrier, and means for determining such movement of translation comprising a roll mounted on said carrier and a track in which said roll is guided.

32. In a machine for shaping uppers over forms, an upper trimming cutter, a slide in which said cutter is mounted for rotary movement, a head in which said slide is mounted, a member in which said head is mounted for angular movement, an actuator carried by said slide, connections from said actuator for rotating the cutter, and other connections from said actuator for imparting a movement of translation to said cutter.

33. In a machine for shaping uppers over forms, an upper trimming cutter, a carrier in which said cutter is mounted for rotary movement, means for determining a path of bodily movement of said cutter comprising a roll mounted on said carrier and a track in which said roll is guided, and means for imparting a movement of translation to the cutter comprising a sprocket mounted on the carrier, and a fixed chain on which said sprocket operates.

34. In a machine for shaping uppers over forms, an upper trimming cutter, a carrier in which the cutter is mounted for rotary movement, means for effecting movements of translation of said trimming cutter, an electric motor, connections from said motor for rotating said cutter, connections from said motor to said means of translation for moving the cutter in one direction about an upper in the machine, and automatic means for reversing the direction of rotation of the motor thereby to cause return movement of the cutter to its starting position.

35. In a machine for shaping uppers over forms, an upper trimming cutter, a carrier in which the cutter is mounted for rotary movement, means for effecting movements of translation of said trimming cutter, an electric motor, connections from said motor for rotating said cutter, connections from said motor to said means of translation for moving the cutter in one direction about an upper in the machine, automatic means for reversing the direction of rotation of the motor thereby to cause return movement of the cutter to its starting position, and automatic means for stopping the motor when the cutter reaches its starting position.

36. In a machine for shaping uppers over forms, an upper trimming cutter, a carrier in which said cutter is mounted for rotary movement, means of locomotion mounted on said carrier, a track for guiding said means of locomotion, an electric motor mounted on said carrier, connections from said motor for rotating said cutter, other connections from said motor to said means of locomotion, means operating automatically to reverse the direction of rotation of the motor thereby to cause return movement of the cutter, and means for automatically interrupting the flow of electricity to the motor when the cutter reaches its starting position.

37. In a machine for shaping uppers over forms, an upper trimming cutter, a slide in which said cutter is mounted for rotary movement, a head in which said slide is mounted, means in which said head is mounted for angular movement, and a member on which said mounting means is positioned for adjustive movement toward and from an upper in the machine.

38. In a machine for shaping uppers over forms, an upper trimming cutter, a slide in which said cutter is mounted for rotary movement, a head in which said slide is mounted, a column in which said head is pivotally mounted for angular movement, a plate on which said column is mounted for adjustive movement toward and from an upper in the machine, and means for effecting such adjustive movement of the column.

39. In a machine for shaping uppers over forms, the combination with an upper trimming cutter constructed and arranged to cut through the entire thickness of the upper materials thereby to trim excess marginal substance from the upper, of means for tensioning an upper over a form, means for shaping the tensioned upper to the contour of the form, and retaining means operating after the upper has been so tensioned and shaped to the form for pressing the upper against the form during the operation of the cutter.

40. In a machine for shaping uppers over forms, a gripper jaw, an upper retarding member, a bar on which said jaw and said retarding member are mounted, and means for establishing a relative bias between the bar and the retarding member in a certain direction.

41. In a machine for shaping uppers over forms, a bar, a carrier in which said bar is slidably mounted, an upper gripper jaw formed at one end of said bar, a cooperating gripper jaw mounted in said bar for opening and closing movements, an upper retarding member mounted on said bar for relative movement toward and from an upper in the machine, a slide carried by said bar and constructed and arranged to close said gripper jaws, and a spring mounted on said carrier and constructed and arranged to press said upper retarding member against the upper.

42. In a machine for shaping uppers over forms, a work support, a plate patterned to the shape of a portion of an insole and mounted on said support, said plate having a groove extending inwardly from its edge face, a toe form removably mounted on said plate, and a heel form separate from the toe form and arranged to cooperate with said toe form.

43. In a machine for shaping uppers over forms, a work support, a plate patterned to the shape of an insole and fixed to said support, said plate having a groove extending inwardly from its edge face, a toe form removably mounted on said plate, and a heel form mounted for movement toward and from the toe form longitudinally thereof.

44. In a machine for shaping uppers over forms, a work support, a flat plate patterned to the shape of an insole and secured to said support, a toe form having a flat bottom surface removably mounted on said plate, means for registering the toe form on said plate with the edge of its bottom face registering with the edge face of said plate, and a heel form mounted on said support.

45. In a machine for shaping sling-back uppers over forms, a work support, a toe form mounted on said support, and a member mounted on said support, said member being provided with a recess for receiving the strap at the heel end of a sling-back upper.

46. In a machine for shaping uppers over forms, a work support, and a plate patterned to the shape of an insole and secured to said support, said plate having provision therein for the registering thereon of an upper shaping form, said plate having a groove extending inwardly from its edge face.

47. In a machine for shaping uppers over forms, a work support, a plate patterned to the shape of an insole and fixed to said support, a toe form removably mounted on said plate, a member slidably mounted in a way in the work support, and means for holding the member against toeward movement.

48. In a machine for shaping uppers over forms, a work support, a flat plate patterned to the shape of an insole and secured to said support, a flat bottomed toe form removably mounted on said plate, said work support being provided with a groove extending in the direction of the length of the toe form, a member slidably mounted in said groove, a spring for urging the member toewardly, and a latch for holding the member against toeward movement.

49. In a machine for shaping uppers over forms, a work support, a flat plate patterned to the shape of an insole and secured to said support, means incorporated in said plate for registering a toe form relatively thereto, said work support being provided with a groove extending in the direction of the length of said plate and constructed and arranged to mount an upper engaging member.

50. In a machine for shaping shoe uppers, a shoe form, means for shaping an upper over said form comprising upper tensioning grippers, a pair of toe wipers, a retarder constructed and arranged to engage the bottom margin at the toe end of the upper and press it against said wipers, auxiliary retarders constructed and arranged to engage the bottom margin at opposite sides of the toe portion of the upper and press it against said wipers, and means for effecting relative movement of the shoe form and the upper shaping means heightwise of the form.

51. In a machine for shaping shoe uppers, a shoe form, means for shaping an upper over said form comprising upper tensioning grippers, a pair of toe wipers, a retarder constructed and arranged to engage the bottom margin at the toe end of the upper and press it against said wipers, auxiliary retarders constructed and arranged to engage the bottom margin at opposite sides of the toe portion of the upper and press it against said wipers, a work supporting member on which said shoe form is mounted, and means for moving said work supporting member heightwise of the shoe form thereby to cause an upper held by said shaping means to be shaped over the form.

52. In a machine for shaping shoe uppers, a toe form, a plate arranged in contiguous relation to the sole face of the form, said plate having a pattern substantially duplicating the pattern of said sole face, upper shaping wipers constructed and arranged to wipe the upper heightwise thereof against the form and against the edge face of said plate, means operating after the wiping operation to press against the form that portion of the upper adjacent to the plate, an upper trimming cutter, and means for actuating said cutter to trim the upper on a line between the pressing means and the wipers while the upper is held in wiped position by the wipers and the pressing means.

LLOYD G. MILLER.

REFERENCES CITED

The following references are of record in the file of this patent:

UNITED STATES PATENTS

| Number | Name | Date |
| --- | --- | --- |
| 295,187 | Marshall | Mar. 18, 1884 |
| 605,091 | Eisenberg | June 7, 1898 |
| 1,014,835 | McFeely | Jan. 16, 1912 |
| 1,396,005 | Ashton | Nov. 8, 1921 |
| 1,580,893 | Hubbard | Apr. 13, 1926 |
| 1,702,397 | Baxter | Feb. 19, 1929 |
| 1,729,683 | Pym | Oct. 1, 1929 |
| 1,980,435 | Pym et al. | Nov. 13, 1934 |
| 2,028,351 | Pym et al. | Jan. 21, 1936 |
| 2,166,936 | Bessom | July 25, 1939 |
| 2,217,771 | Pym | Oct. 15, 1940 |
| 2,226,754 | Eek et al. | Dec. 31, 1940 |
| 2,245,580 | Eastman | June 17, 1941 |
| 2,246,748 | Miller | June 24, 1941 |
| 2,260,483 | Roberts | Oct. 28, 1941 |
| 2,318,509 | Marx | May 4, 1943 |
| 2,324,509 | Jorgensen | July 20, 1943 |
| 2,359,762 | Holmgren | Oct. 10, 1944 |
| 2,428,062 | Burby | Sept. 30, 1947 |
| 2,466,798 | Elliott | Apr. 12, 1949 |
| 2,481,756 | Jorgensen | Sept. 13, 1949 |